(12) United States Patent
Bennison et al.

(10) Patent No.: US 10,538,063 B2
(45) Date of Patent: Jan. 21, 2020

(54) MULTILAYER INTERLAYER AND GLASS LAMINATE

(71) Applicant: KURARAY AMERICA, INC., Houston, TX (US)

(72) Inventors: Stephen Bennison, Wilmington, DE (US); Charles Anthony Smith, Vienna, WV (US); Steven M. Hansen, Wilmington, DE (US); Toshiyuki Iguchi, Niigata (JP); Rebecca L. Smith, Vienna, WV (US); Takeshi Kusudou, Okayama (JP); Takuya Kobayashi, Okayama (JP)

(73) Assignee: KURARAY AMERICA, INC., Houston, TX (US)

( * ) Notice: Subject to any disclaimer, the term of this patent is extended or adjusted under 35 U.S.C. 154(b) by 236 days.

(21) Appl. No.: 15/588,986

(22) Filed: May 8, 2017

(65) Prior Publication Data

US 2017/0320297 A1   Nov. 9, 2017

Related U.S. Application Data

(60) Provisional application No. 62/333,371, filed on May 9, 2016.

(51) Int. Cl.
    *B32B 17/10*   (2006.01)

(52) U.S. Cl.
    CPC .. *B32B 17/10779* (2013.01); *B32B 17/10036* (2013.01); *B32B 2307/102* (2013.01); *B32B 2307/306* (2013.01); *B32B 2307/546* (2013.01); *B32B 2307/718* (2013.01)

(58) Field of Classification Search
    CPC ........ B32B 17/10779; B32B 17/10036; B32B 17/10633; B32B 17/10678; B32B 17/10743
    See application file for complete search history.

(56) References Cited

U.S. PATENT DOCUMENTS

| | | | |
|---|---|---|---|
| 3,700,633 A | 10/1972 | Wald et al. | |
| 4,822,684 A | 4/1989 | Hotta et al. | |
| 6,132,882 A | 10/2000 | Landin et al. | |
| 6,669,890 B1 | 12/2003 | Sato et al. | |
| 2001/0039310 A1 | 11/2001 | Numura et al. | |
| 2002/0150744 A1 | 10/2002 | Nagai et al. | |
| 2004/0234778 A1 | 11/2004 | Fukatani et al. | |
| 2004/0242721 A1 | 12/2004 | Muyldermans et al. | |
| 2005/0249959 A1 | 11/2005 | Okamoto et al. | |
| 2006/0110593 A1 | 5/2006 | Fukatani et al. | |
| 2008/0210287 A1 | 9/2008 | Volpp et al. | |
| 2011/0272026 A1 | 11/2011 | Nishijima | |
| 2012/0088082 A1 | 4/2012 | Friedman et al. | |
| 2012/0162752 A1 | 6/2012 | Kitano et al. | |
| 2012/0171498 A1 | 7/2012 | Hatta | |
| 2012/0202070 A1 | 8/2012 | Asanuma et al. | |
| 2012/0204940 A1 | 8/2012 | Asanuma et al. | |
| 2013/0288061 A1 | 10/2013 | Kitano et al. | |
| 2015/0158986 A1 | 6/2015 | Xu et al. | |
| 2015/0333206 A1 | 11/2015 | Nishijima | |

FOREIGN PATENT DOCUMENTS

| | | |
|---|---|---|
| CN | 85 1 06415 A | 3/1987 |
| CN | 102438963 A | 5/2012 |
| CN | 102482147 A | 5/2012 |
| CN | 102574379 A | 7/2012 |
| CN | 102575080 A | 7/2012 |
| CN | 102625786 A | 8/2012 |
| CN | 103080035 A | 5/2013 |
| CN | 103124702 A | 5/2013 |
| CN | 103773258 A | 5/2014 |
| CN | 104797653 A | 7/2015 |
| EP | 2 330 090 A1 | 6/2011 |
| EP | 2 330 090 A4 | 6/2011 |
| EP | 2 679 558 A1 | 1/2014 |
| JP | 61-247646 A | 11/1986 |
| JP | 62-116140 A | 5/1987 |
| JP | 5-51243 A | 3/1993 |
| JP | 5-270870 A | 10/1993 |
| JP | 8-295543 A | 11/1996 |
| JP | 9-30846 A | 2/1997 |
| JP | 2000-272937 A | 10/2000 |
| JP | 2001-506198 A | 5/2001 |
| JP | 2001-294450 A | 10/2001 |
| JP | 2002-514533 A | 5/2002 |
| JP | 2002-326847 A | 11/2002 |
| JP | 2003-252657 A | 9/2003 |
| JP | 2004-2108 A | 1/2004 |
| JP | 2004-175593 A | 6/2004 |
| JP | 2005-139046 A | 6/2005 |

(Continued)

OTHER PUBLICATIONS

JP 2009 256128 Machine translation Original document (2009).*
International Search Report and Written Opinion dated Jul. 4, 2017 in PCT/US2017/031509.
"Wire and cable materials-structure, performance, and applications", supervised by Guo Honoxia, pp. 234 to 237, China Machine Press, Jul. 2012, 1st edition (with partial English translation).

*Primary Examiner* — Edward J Cain
(74) *Attorney, Agent, or Firm* — Oblon, McClelland, Maier & Neustadt, L.L.P.

(57) ABSTRACT

A multilayer interlayer containing a specified ionomer skin layer and an acoustic damping intermediate layer, and laminate containing such interlayer are provided, wherein the laminate has a desirable combination of sound insulating, flexural strength and optical properties suitable for use in transportation and architectural end uses.

43 Claims, 4 Drawing Sheets

(56) References Cited

FOREIGN PATENT DOCUMENTS

| | | |
|---|---|---|
| JP | 2005-206445 A | 8/2005 |
| JP | 2005-213068 A | 8/2005 |
| JP | 2007-39278 A | 2/2007 |
| JP | 2007-91491 A | 4/2007 |
| JP | 2007-136057 A | 6/2007 |
| JP | 2007-331964 A | 12/2007 |
| JP | 2008-266138 A | 11/2008 |
| JP | 2009-45874 A | 3/2009 |
| JP | 2009-256128 A | 11/2009 |
| JP | 2009-256129 A | 11/2009 |
| JP | 2010-201932 A | 9/2010 |
| JP | 2010-235432 A | 10/2010 |
| JP | 2011-42552 A | 3/2011 |
| JP | 2011-240676 A | 12/2011 |
| JP | 2012-6406 A | 1/2012 |
| JP | 2012-81748 A | 4/2012 |
| JP | 2013-6725 A | 1/2013 |
| JP | 2013-112791 A | 6/2013 |
| JP | 2013-141800 A | 7/2013 |
| JP | 2013-224257 A | 10/2013 |
| JP | 2014-58409 A | 4/2014 |
| JP | 6138377 B2 | 5/2014 |
| WO | WO 98/26927 A1 | 6/1998 |
| WO | WO 03/018502 A1 | 3/2003 |
| WO | WO 2010/038801 | 4/2010 |
| WO | WO 2010/055731 A1 | 5/2010 |
| WO | WO 2011/016494 A1 | 2/2011 |
| WO | WO 2011/016495 A1 | 2/2011 |
| WO | WO 2011/024783 A1 | 3/2011 |
| WO | WO 2011/024787 A1 | 3/2011 |
| WO | WO 2011/024788 A1 | 3/2011 |
| WO | WO 2012/008582 A1 | 1/2012 |
| WO | WO 2012/108537 A1 | 8/2012 |
| WO | WO 2012/133668 A1 | 10/2012 |
| WO | WO 2013/105657 A1 | 7/2013 |
| WO | WO 2013/176258 A1 | 11/2013 |
| WO | WO 2013/181484 A1 | 12/2013 |
| WO | WO 2014/046102 A1 | 3/2014 |
| WO | WO 2014/061669 A1 | 4/2014 |

\* cited by examiner

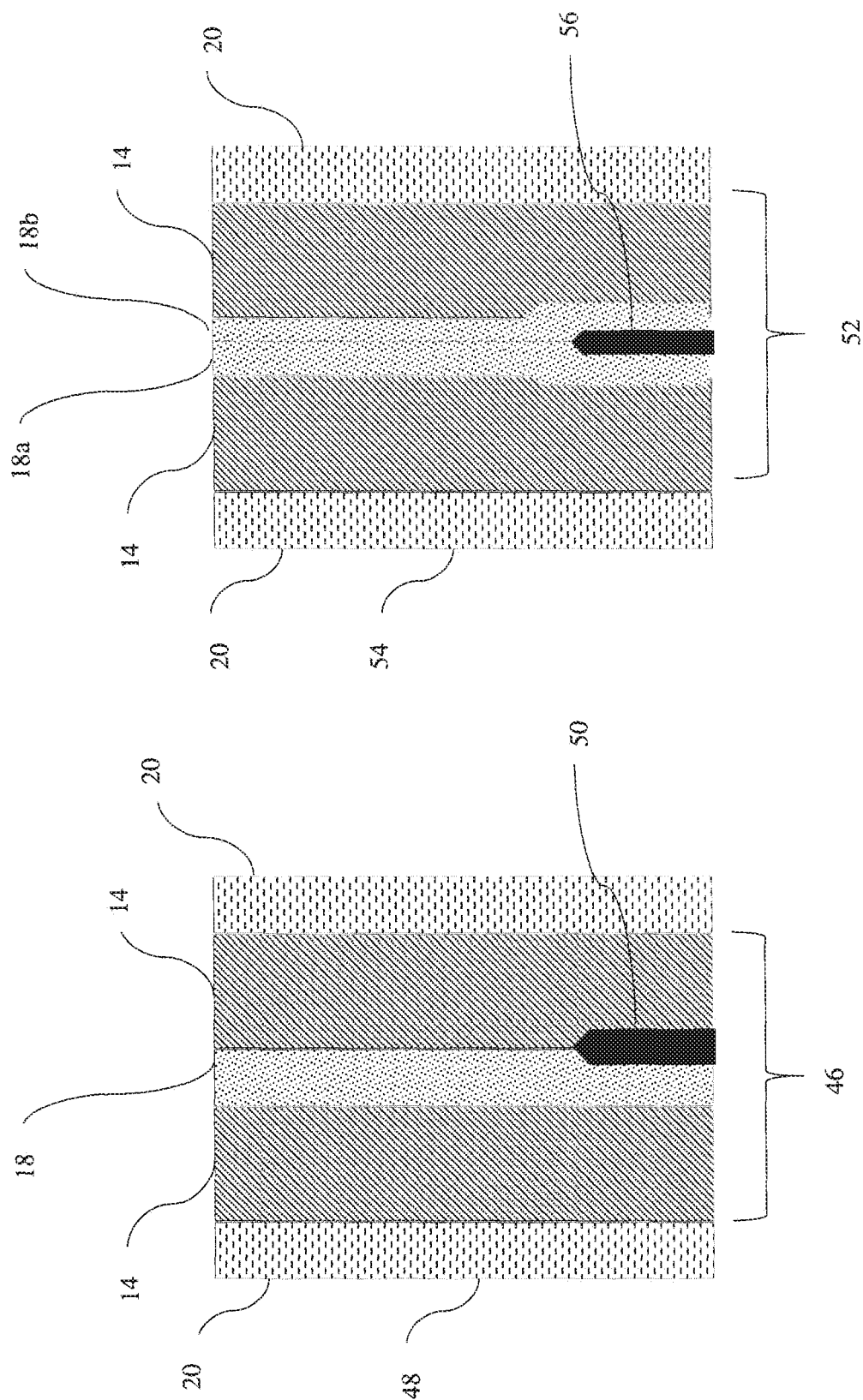

MULTILAYER INTERLAYER AND GLASS LAMINATE

CROSS-REFERENCE TO RELATED APPLICATIONS

This application claims priority under 35 U.S.C. § 119 from U.S. Provisional Application Ser. No. 62/333,371 (filed 9 May 2016), the disclosure of which is incorporated by reference herein for all purposes as if fully set forth.

This application is related to PCT/JP2015/81664, PCT/JP2015/81665, PCT/JP2015/81666, PCT/JP2015/81667 and PCT/JP2015/81668, all filed on 10 Nov. 2015, and all of which are incorporated by reference herein for all purposes as if fully set forth.

FIELD OF THE INVENTION

The present invention relates generally to a multilayer interlayer and a glass laminate containing such interlayer. More particularly, the present invention relates to a multilayer interlayer containing at least one ionomer skin layer and at least one sound insulating intermediate layer, in which a glass laminate containing such interlayer possesses a desirable combination of acoustic damping, acoustic barrier, flexural strength, bending stiffness and optical properties, and optionally solar heat shielding properties, which can allow for reducing the weight of the resulting glass laminate.

BACKGROUND OF THE INVENTION

While glass plates which are used for windowpanes and the like are excellent in durability and optical properties, their sound damping and acoustic barrier performance (tan δ against flexural vibration), and shatter resistance, can be insufficient for many end uses. This is especially true if the application requires a light weight glazing element where thin glass plates are required.

Laminated glass is generally made by laminating two pieces of glass onto a plastic interlayer. The interlayer can greatly improve shatter resistance, sound damping and sound barrier performance of the laminate as compared to a comparably thick glass sheet, but often to the disadvantage of optical, flexural strength, stiffness and other properties.

In addition to high transparency and shatter resistance, many uses of laminated glass require a desirable combination of excellent sound insulating properties (both against a sound inside and outside) and flexural strength and stiffness under external load influences (for example, as glass building materials and automotive end uses).

Polyvinyl acetals represented by polyvinyl butyral are excellent in adhesion to or compatibility with various organic or inorganic base materials and solubility in organic solvents, and they are widely utilized as various adhesives or binders for ceramic, various inks, paints, and the like as well as safety glass interlayer films.

Films containing a polyvinyl acetal and a plasticizer are widely utilized as an interlayer film for laminated glass because they are excellent in adhesion to a glass. Laminated glass containing such interlayers can be made with good transparency, mechanical strength and flexibility, and shatter resistance.

In the case of constructing a glass in a place for which sound insulation is required, such as a window, the thickness of glass can be increased to enhance a sound insulating effect by weight, and a sound dampening interlayer can be laminated between two or more sheets of glass to enhance a sound insulating effect. In the latter method of using an interlayer film, the sound insulating properties of a windowpane are improved by using the interlayer film having a damping performance, and the interlayer film may also have ability of converting vibration energy into heat energy, thereby absorbing the vibration energy.

As one method of improving sound insulating properties, there is proposed a multilayer interlayer in which a polystyrene copolymer intermediate film between two exterior layers of a thermoplastic polymer material is laminated between two sheets of glass (see, for example, JP2007-91491A). As an example of a thermoplastic polymer material is mentioned a plasticized polyvinyl acetal-based resin and an ethylene-(meth)acrylic ester copolymer resin. However, the flexural strength of the laminate is not sufficient, making it unsuitable for uses under external load influences.

Other plastic materials have found wide use in safety laminates. For example, U.S. Pat. No. 7,951,865B1 discloses the use of an at least partially neutralized ethylene acid copolymer (ionomer) as an interlayer for preparing laminated safety glass. While these types of ionomers have excellent flexural strength and adhesion to glass properties, and good optical properties, laminates made from such ionomer interlayers do not possess good sound dampening properties.

As another method, there is proposed an interlayer film for laminated glass composed of polyvinyl butyral and having certain impact resistance and sound insulating properties (see, for example, U.S. Pat. No. 7,452,608B2). The interlayer film cam be single- or multilayer but, again, the flexural strength of the laminate is not sufficient for uses under external load influences.

In addition to the above, there has been much development in preparing multilayer films of polyvinyl acetal resins in which at least one of the intermediate polyvinyl acetal layers has sound dampening qualities. For example, there is proposed a method in which a sound insulating layer is constituted of three layers of PVB film (see, for example, US2013/0183507A1) and the like. However, the sound insulating properties of the proposed system was not maintained at a high level over a broad temperature range.

Other materials have been proposed to replace the intermediate polyvinyl acetal sound dampening layer, for example, a viscoelastic acrylic layer such as disclosed in U.S. Pat. No. 7,121,380B2, a layer containing a copolymer of styrene and a rubber-based resin monomer between layers containing a thermally adhesive resin such as disclosed in JP 2009-256128A, a layer containing a polyolefin such as disclosed in US2012/0204940A1, a layer containing an ethylene/vinyl acetate polymer such as disclosed in WO2015/013242A1, and a layer containing an ethylene acid copolymer such as disclosed in WO2015/085165A1.

In the transportation field, for example for the purpose of reducing the weight of a vehicle to improve fuel efficiency, thinning of glass is being advanced in recent years. However, when the glass is thinned, a coincidence threshold frequency (the coincidence threshold frequency means a lowest frequency in a frequency region where a coincidence effect in which the sound insulating performance falls in a high-frequency region as compared with that expected by the mass law) shifts toward the high-frequency side, so that the sound insulating performance in a high-frequency region is lowered. In the conventional laminated glasses using an intermediate film having sound insulating properties, the above-described phenomenon is liable to take place, so that improvements were required.

In addition, thinning the glass reduces the load-bearing capacity and stiffness of the laminate thus leading to structural reliability challenges in the design of light weight glazing.

In order to obtain laminated glass with improved sound insulating properties in a high-frequency region, there were proposed a method of adjusting a thickness of each layer of a multilayer interlayer and a hydroxyl group quantity of a polyvinyl acetal resin (see, for example, US2013/0183507A1), a method of selecting a polyvinyl acetal resin and a plasticizer in each layer of a multilayer interlayer such that a cloud point of a plasticizer solution obtained from a polyvinyl acetal resin and a plasticizer constituting each layer is a prescribed relation (see, for example, U.S. Pat. No. 8,741,439B2), a method of crosslinking a sound insulating layer (see, for example, JP2012-214305A), a method of using a plasticizer such that a difference in an SP value from a polyvinyl acetal resin is a prescribed value or more (see, for example, U.S. Pat. No. 8,883,317B2), and the like. However, the improvement of the sound insulating properties in a high-frequency region was not sufficient.

As indicated previously, polyvinyl acetals (and in particular polyvinyl butyral) are the predominant thermoplastic materials used as interlayers for glass laminates. These materials are used in a highly plasticized form, in other words, high amounts of plasticizers are added to polyvinyl acetals for use as interlayers.

In preparing a laminated glass, a heat treatment using an autoclave or the like is conducted. However, when a multilayer interlayer film with plasticized components is heated, an interlayer migration of plasticizer occurs, so that distribution of the plasticizer changes. After preparation of the laminated glass, the distribution of the plasticizer moves back towards the original state with a lapse of time at ordinary temperature; however, in view of the fact that the plasticizer migrates into other layer, physical properties, such as sound insulating properties, become unstable until equilibrium is reached. For that reason, in the case of preparing a laminated glass using the conventional multi-layered intermediate film, it is needed to retain the prepared laminated glass for a certain period of time until the sound insulating performance is stabilized. This retention time is problematic from the viewpoint of productivity, and an improvement is required in laminated glasses having a sound insulating function.

In addition, plasticizer equilibrium is dependent on temperature, so even in intermediate films for laminated glass having high sound insulating properties at ordinary temperature, there was involved such a problem that the sound insulating properties are largely lowered in the summer season or winter season. For that reason, a laminated glass capable of revealing the sound insulating properties at a high level over a broad temperature range was required.

SUMMARY OF THE INVENTION

The present invention addresses the above-described problems by providing a multilayer interlayer which, when laminated between two panes of glass, provides a glass laminate with a desirable combination of sound insulating, flexural strength, stiffness and optical properties, and desirably heat-shielding properties, and even more desirably over a broad range of environmental conditions.

In accordance with a first embodiment, the present invention provides a multilayer interlayer comprising:

(1) a first skin layer A which is a layer of a first thermoplastic resin optionally containing one or more additives, (2) a second skin layer C which is a layer of a second thermoplastic resin optionally containing one or more additives, and (3) an acoustic damping layer B between the first skin layer A and the second skin layer C, wherein (I) the first thermoplastic resin and the second thermoplastic resin are the same or different, (II) at least one of the first thermoplastic resin and the second thermoplastic is a first ionomer resin, and (III) the acoustic damping layer B is a layer of a thermoplastic elastomer resin optionally containing one or more additives, and wherein the first ionomer resin is an at least partially neutralized ethylene acid copolymer comprising copolymerized units of:

(a) ethylene, (b) from about 10 to about 30 wt % of at least one α,β-unsaturated carboxylic acid having 3 to 10 carbon atoms, and (c) from about 2 wt % to about 15 wt % of at least one derivative of an saturated carboxylic acid having 3 to 10 carbon atoms, wherein (i) the weight percentages of the copolymerized units are based on the total weight of the ethylene acid copolymer and the sum of the weight percentages of the copolymerized units is 100 wt %, (ii) the at least one derivative of an α,β-unsaturated carboxylic acid having 3 to 10 carbon atoms comprises an α,β-unsaturated carboxylic acid ester, and (iii) at least a portion of carboxylic acid groups of the α,β-unsaturated carboxylic acid are neutralized to form an ionomer comprising carboxylate groups having counterions.

In a more specific embodiment, the thermoplastic elastomer resin is a hydrogenated product of a block copolymer having:

(i) an aromatic vinyl polymer block (a) containing about 60 mol % or more of an aromatic vinyl monomer unit, based on the aromatic vinyl polymer block, and (ii) an aliphatic unsaturated polymer block (b) containing about 60 mol % or more of a conjugated diene monomer unit, based on the aliphatic unsaturated polymer block, wherein the aliphatic unsaturated polymer block (b) contains about 50 mol % or more in total of an isoprene unit and a butadiene unit as the conjugated diene monomer unit, and wherein the amount of residual carbon-carbon double bonds the aliphatic unsaturated polymer block derived from conjugated diene monomer units is from about 2 to about 40 mol %.

In accordance with a second embodiment, the present invention provides a laminate comprising a first exterior sheet and second exterior sheet having interposed therebetween a multilayer interlayer as described herein, wherein at least one of the exterior sheets is a sheet of glass.

In a more specific preferred embodiment, the first and second sheets are both sheets of glass and are the same type of glass or each is a different type of glass. The laminate can be symmetric (both sheets of glass are substantially equal thickness) or asymmetric (the first and second sheets of glass are a different thickness) with respect to the glass. Further, the interlayer as a whole can be symmetric having a substantially consistent thickness, or can be asymmetric wherein a portion of the interlayer has a thickness greater than another portion (for example, "wedge" as discussed below). Further, the laminate can be substantially clear or having coloring in all or a portion (for example, "shadeband" as discussed below).

By using the multilayer interlayers according to the present invention, it is possible to prepare a laminated glass with excellent sound insulating characteristics, flexural strength and stiffness. According to this, it becomes possible to apply the laminated glass in a place where good external load influence and sound insulating properties are required, such as glass building materials for building and sunroofs or rear glasses for automobiles. Meanwhile, in view of the fact that the laminated glass is excellent in flexural strength and stiffness, it also becomes possible to thin the glass to be used for the laminated glass, and weight reduction of the laminated glass can be realized while still maintaining acceptable strength and stiffness of the laminated glass.

In addition, according to the present invention, it is possible to prepare a laminated glass in which a lowering of sound insulating performance in a high-frequency region to be caused due to a coincidence phenomenon is suppressed and which is excellent in sound insulating properties.

Furthermore, according to the present invention, it is possible to provide a laminated glass in which a time-dependent change of sound insulating performance after preparation of the laminated glass is small and which is excellent in stability of sound insulating performance.

In addition to the above, according to the present invention, it is possible to provide a laminated glass which is excellent in sound insulating properties over a broad temperature range.

In addition, according to the present invention, it is possible to prepare a laminated glass having excellent overall optical properties.

Thus, the laminates in accordance with the present invention provide a desirable combination of sound insulating, flexural strength, stiffness and optical properties, and desirably solar heat shielding properties, suitable for use in a variety of transportation and architectural end uses.

These and other embodiments, features and advantages of the present invention will be more readily understood by those of ordinary skill in the art from a reading of the following detailed description.

BRIEF DESCRIPTION OF THE DRAWINGS

FIG. 6 is a diagram of a sixth embodiment of laminate containing a multilayer interlayer (trilayer) with the same skin layer and with a colorant layer between a portion of the acoustic layer and a skin layer to result in an offset "shadeband" configuration, in accordance with the present invention.

FIG. 7 is a diagram of a seventh embodiment of laminate containing a multilayer interlayer (4-layer) with the same skin layer and with a colorant layer approximately centered between two layers of the center (acoustic) layer to result in a centered "shadeband" configuration, in accordance with the present invention.

DETAILED DESCRIPTION

Figure 1:
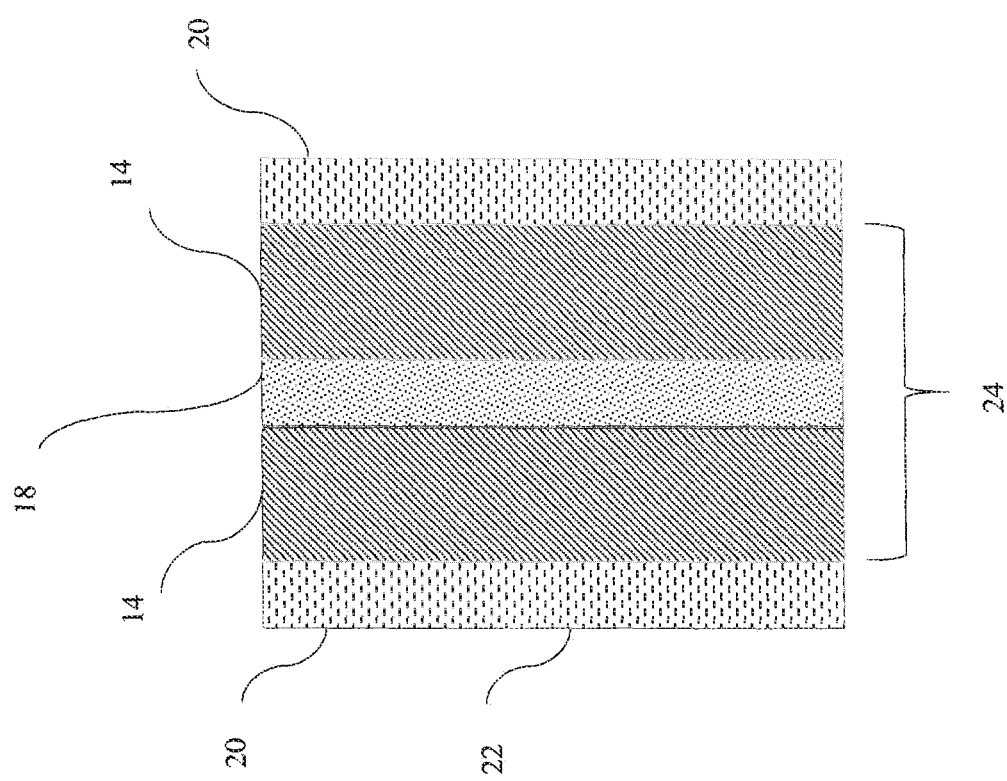
FIG. 1 is a diagram of a first embodiment of laminate containing a multilayer interlayer with different skin layers, in accordance with the present invention.

The present invention relates to a multilayer interlayer, a glass laminate containing such multilayer interlayer and various end uses of such glass laminate. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen and ethylene), and otherwise is on a weight basis (such as for additive content).

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers comprising at least three monomers.

The term "acid copolymer" as used herein refers to a copolymer comprising copolymerized units of an α-olefin, an α,β-ethylenically unsaturated carboxylic acid, and optionally other suitable comonomer(s) such as, an α,β-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The term "ionomer" as used herein refers to a polymer that comprises ionic groups that are carboxylate salts, for example, ammonium carboxylates, alkali metal carboxylates, alkaline earth carboxylates, transition metal carboxylaces and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a sodium ionomer, for example a copolymer of ethylene and methacrylic acid wherein all or a portion of the carboxylic acid groups of the copolymerized methacrylic acid units are in the form of sodium carboxylates. An example of a mixed metal ionomer as used herein is a zinc/sodium ionomer (or zinc/sodium neutralized mixed ionomer), for example a copolymer of ethylene and methacrylic acid wherein all or a portion of the carboxylic acid groups of the copolymerized methacrylic acid units are in the form of zinc carboxylates and sodium carboxylates.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Interlayer and Laminate Structure

As indicated above, the interlayer of the present invention is a multilayer structure with a sound insulating layer (Layer B) between two skin layers (Layers A and C).

The laminate of the present invention is a laminate comprising the multilayer interlayer laminated between two sheets of material, at least one of which is (and preferably both are) a sheet of glass.

In one embodiment, Layer B is in direct contact with both Layers A and C, but intermediate layers may also be utilized as discussed below.

A preferred embodiment of a multilayer interlayer (10) and a glass laminate (12) in accordance with the present invention is shown in FIG. 1. The multilayer interlayer (10) comprises a first skin layer A (14) which is an ionomer resin as generally described above and as described in detail below. The multilayer interlayer (10) further comprises a second skin layer C (16) which can be any thermoplastic resin suitable for use in a glass laminate, as further described below. Interposed between first skin layer A (14) and second skin layer C (16) is an acoustic damping layer (18) which is a thermoplastic elastomer resin. The multilayer interlayer (10) is laminated between two sheets (20) of glass. In FIG. 1, the two sheets (20) of glass are of the same type and size (symmetric glass) for exemplification.

Figure 2:
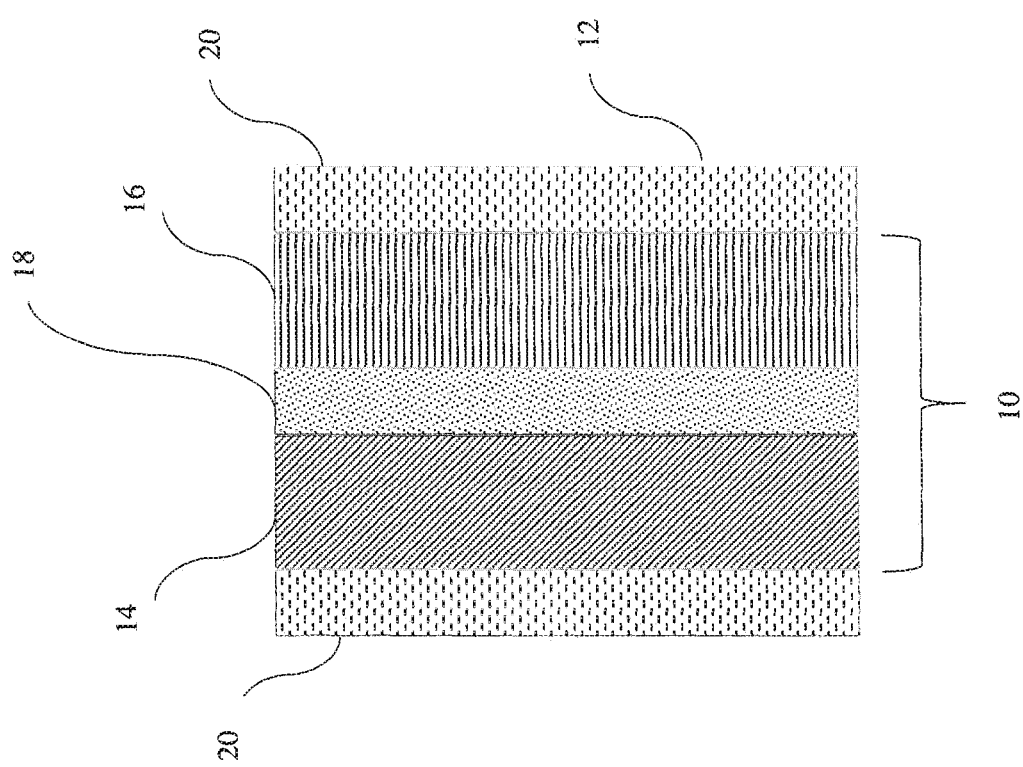
FIG. 2 is a diagram of a second embodiment of laminate containing a multilayer interlayer with the same skin layers, in accordance with the present invention.

Another preferred embodiment is a multilayer interlayer (24) in which the two skin layers (14) A and C are both an ionomer resin as generally described above and as described in detail below. Interposed between skin layers A and C (14) is an acoustic damping layer (18) which is a thermoplastic elastomer resin. The multilayer interlayer (24) is laminated between two sheets (20) of glass to make glass laminate (22). In FIG. 2, the two sheets (20) of glass are again of the same type and size (symmetric laminate) for exemplification.

Figure 3:
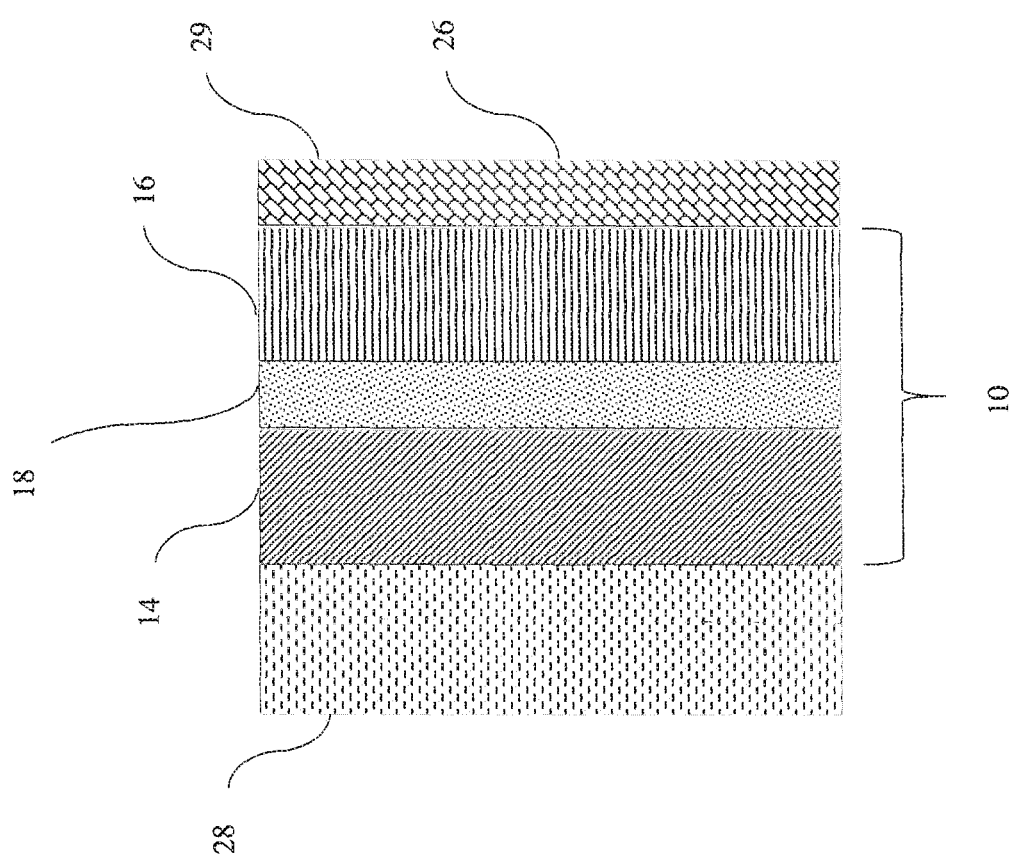
FIG. 3 is a diagram of a third embodiment of laminate with different thickness and type of glass, and containing a multilayer interlayer with different skin layers, in accordance with the present invention.

Yet another preferred embodiment in shown in FIG. 3, which shows a glass laminate (26) containing a multilayer interlayer (10) as described above for FIG. 1, but a first sheet (28) of glass is of a different thickness and type than a second sheet (29) of glass (asymmetric glass).

Figure 4:
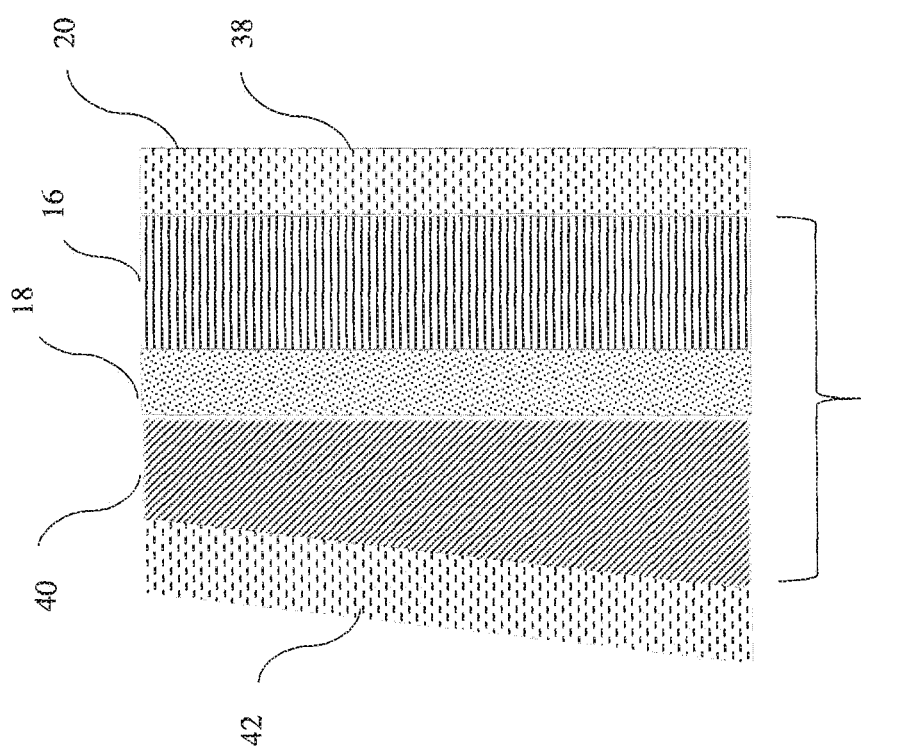
FIG. 4 is a diagram of a fifth embodiment of a laminate with same thickness and type of glass, and containing an asymmetrical multilayer interlayer with one skin layer having a thicker portion to result in a "full wedge" configuration, in accordance with the present invention.

Another preferred embodiment is shown in FIG. 4, which is a laminate (38) that contains a wedge-shape multilayer interlayer (44).

In a "standard wedge" such as shown in FIG. 4, the interlayer will typically be an isosceles trapezoid or a right trapezoids with the thickness varying gradually from one edge to the other, with a wedge angle typically in the range of from about 0.1 mrad to about 0.7 mrad, and with a difference between the thick and thin sides typically greater than about 0.1 mm.

As shown in FIG. 4, skin layer (40) is wedge shaped, while acoustic layer (18) and skin layer (16) are rectangular. Exterior glass sheet (20) contacts and is substantially parallel to skin layer (16), while exterior glass sheet (42) contacts the non-parallel side of skin layer (40) and thus is not parallel to sheet (20).

Figure 5:
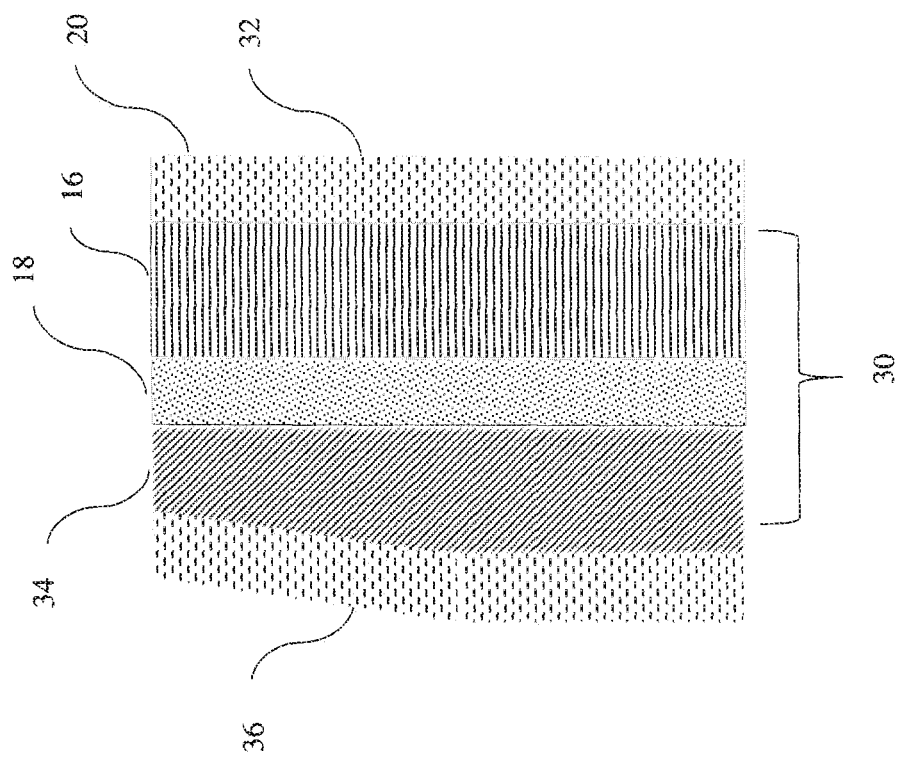
FIG. 5 is a diagram of a fourth embodiment of a laminate with same thickness and type of glass, and containing an asymmetrical multilayer interlayer with one skin layer having a thicker portion to result in a "partial wedge" configuration, in accordance with the present invention.

Another preferred embodiment is shown in FIG. 5, which is a laminate (32) referred to as "partial wedge". In a partial wedge, the interlayer (30) should typically have uniform thickness profile for at least about 20% of the width and then a wedge shaped profile with the thickness decreasing from the area of uniform thickness, and wedge angles and other ranges would be similar to standard wedge.

As shown in FIG. 5, skin layer (34) is partially-wedge shaped, while acoustic layer (18) and skin layer (16) are rectangular. Exterior glass sheet (20) contacts and is substantially parallel to skin layer (16), while exterior glass sheet (36) contacts and conforms to the non-parallel portion of skin layer (34) and thus is not parallel to sheet (20) for that portion.

In general, in a "wedge" the entire multilayer structure can be wedge shaped (all layers), or any single or combination of layers can be wedge shaped, for example, one or both of the outer layers can be wedge shaped with a rectangular core layer(s), or a core layer can be wedge shaped with rectangular outer layer/layers. Additional description and details of wedge interlayers and laminates can be found, for example, by reference to U.S. Pat. No. 8,574,706B2, U.S. Pat. No. 9,067,386B2 and U.S. Pat. No. 5,639,538.

Another preferred embodiment is shown in FIG. 6, which is a laminate (48) with a color layer (50) in the interlayer (46) structure interposed at one end between the acoustic layer (18) and a skin layer (14). This configuration is typical of a shadeband laminate. As shown in FIG. 6, interlayer (46) is considered a trilayer system in which the color layer (50) is offset from the center of interlayer (46) and laminate (48).

Another preferred embodiment is shown in FIG. 7, which is a shadeband version in which the color layer (56) is substantially in the center of interlayer (52) and laminate (54). In such variation, there are two layers (18a) and (18b) of the acoustic layer, making interlayer (52) a 4-layer system (A/B1/B2/C).

Additional details of shadeband interlayers and laminates can be found, for example, by reference to U.S. Pat. Nos. 4,316,868, 8,075,983B2 and 7,842,395B2.

Again these configurations are just exemplary, and many additional configurations will be evident to those of ordinary skill in the relevant art from the description below.

Multilayer Interlayers

Layer B—Acoustic Damping Layer(s)

A response of stress when distortion of a sinusoidal waveform is applied to a viscoelastic body is defined as a complex modulus. At this time, a phase shift is generated between the sinusoidal wave of distortion to be applied and the sinusoidal wave of stress obtained as the response, and this phase difference is expressed in terms of $\delta$. In addition, the complex modulus is expressed in terms of an equality using a complex number, and a real part of the complex modulus is called a storage modulus, whereas an imaginary part thereof is called a loss modulus. In particular, in the case of measuring dynamic viscoelastic characteristics of a viscoelastic body in a shear mode, they are called a complex shear modulus, a shear storage modulus, and a shear loss modulus, respectively. A value obtained by dividing the loss modulus by the storage modulus is called a loss tangent and expressed in terms of tan $\delta$. The value of tan $\delta$ is a loss factor, and it is meant that the higher the loss factor at a certain temperature, the higher the sound insulating properties at that temperature.

When the value of tan $\delta$ in a construct composed of two kinds of viscoelastic bodies is plotted at every measuring temperature, in general, a bimodal curve is revealed. A peak (maximum point) on the low-temperature side is a peak derived from a relatively soft viscoelastic body, and a peak (maximum point) on the high-temperature side is a peak derived from a relatively hard viscoelastic body. In the present embodiment, the peak on the low-temperature side is a peak derived from the layer B (in the case where plural peaks are present, the instant peak means a highest peak), and the peak on the high-temperature side is a peak derived from the skin layers.

Layer B is based on a specified thermoplastic elastomer resin. The resin to be contained in layer B desirably has a peak at which a tan $\delta$ as measured by conducting a complex shear viscosity test under a condition at a frequency of 1 Hz in accordance with HS K 7244-10 is maximum at about $-40°$ C. or higher, or about $-30°$ C. or higher, or about $-20°$ C. or higher. In addition, the resin to be contained in the layer B desirably has a peak at which the tan $\delta$ is maximum at about $30°$ C. or lower, or about $10°$ C. or lower, or about $0°$ C. or lower. When the peak at which the tan $\delta$ of the resin to be contained in the layer B is maximum at about $30°$ C. or lower, excellent sound insulating properties are exhibited in a broad temperature region. When the peak at which the tan $\delta$ of the resin to be contained in the layer B is maximum is present at about $-40°$ C. or higher, the shear storage modulus of the layer B is a suitable value, and the sound insulating properties in a high-frequency region are excellent.

Specifically, the tan $\delta$ of the resin to be contained in the layer B can be measured by the following method. A strain control type dynamic viscosity instrument (manufactured by Rheomix, ARES) having a diameter of a disk of 8 mm is used as a parallel-plate oscillatory rheometer in accordance with HS K 7244-10. Single-layered sheets of layer B (thickness: 0.76 mm) are used as a disk-shaped test sheet. The sheets are stored at a temperature $20°$ C. and at a humidity of 60% RH for 24 hours before use. The gap between the two flat plates is completely filled by the test sheet. A vibration with a strain amount of 1.0% is applied to the test sheet at a frequency of 1 Hz with increasing temperature at a constant rate of $1°$ C./min from $-40°$ C. to $100°$ C. The temperatures of the test sheet and the disk are kept until measured values of shear loss modulus and shear storage modulus did not change. The peak height and peak temperature of tan $\delta$ of the layer B can then be determined.

As a method of adjusting the peak at which the tan $\delta$ of the resin to be contained in the layer B is maximum at about −40° C. to about 30° C., there are, for example, exemplified a method of using a thermoplastic elastomer having a content of a hard segment (for example, an aromatic vinyl polymer block) of about 5% by mass or more and about 40% by mass or less relative to the total mass of a block copolymer (for example, a block copolymer having an aromatic vinyl polymer block and an aliphatic unsaturated hydrocarbon polymer block); a method of containing a structure of a soft segment, for example, allowing a content ratio of a branched monomer in a conjugated diene block, a ratio of a 1,4-bond, a 1,2-bond, and a 3,4-bond, or a hydrogenation ratio to fall within an appropriate range; and the like.

With respect to the content ratio of the branched monomer, for example, in the case of a copolymer of butadiene and isoprene, a content ratio of an isoprene unit in the copolymer is preferably about 20% by mass or more, or about 50% by mass or more. With respect to the ratio of the 1,4-bond, the 1,2-bond, and the 3,4-bond, a ratio of a sum total of the 1,2-bond and the 3,4-bond is preferably about 20 mol % or more, or about 30 mol % or more, or about 40 mol % or more, or about 50 mol % or more relative to a sum total of moles of the 1,4-bond, the 1,2-bond, and the 3,4-bond. The hydrogenation ratio is preferably about 60 mol % or more, or about 65 mol % or more, or about 70 mol % or more, or about 75 mol % or more.

The layer B which is used in the present invention may be composed of only a specified resin or may be one including the resin and another component.

As indicated, the interlayer of the present invention contains a thermoplastic elastomer in the layer B. In one embodiment, layer B contains contains two or more thermoplastic elastomers having a different peak temperature of tan δ (a temperature of the peak at which the tan δ is maximum) from each other. The sound insulating properties become high in the vicinity of a specified temperature related to the peak temperature of tan δ, and hence, in view of the fact that the layer B containing a thermoplastic elastomer contains two or more thermoplastic elastomers having a different peak temperature of tan δ from each other, the sound insulating properties can be enhanced over a broader temperature range.

In addition, in order to reveal suitable sound insulating characteristics in the vicinity of room temperature, it is preferred to regulate the peak temperature of tan δ in the complex shear viscoelasticity test under a condition at a frequency of 1 Hz to about 0° C. or lower, or about −5° C. or lower, or about −10° C. or lower. In that case, by using an elastomer having a physical or chemical crosslinking site, a deviation of glasses at a high temperature at which the laminated glass is exposed can be suppressed. In addition, by using a thermoplastic elastomer as the elastomer, it is possible to conduct the film formation by a coextrusion method, and hence, such is especially preferred.

In addition, the at least two thermoplastic elastomers having a different peak temperature of tan δ from each other are preferably a thermoplastic elastomer including a copolymer of an aromatic vinyl monomer and a vinyl monomer or a conjugated diene monomer, or a hydrogenated product of the copolymer. The copolymer of an aromatic vinyl monomer and a vinyl monomer or a conjugated diene monomer, or the hydrogenated product of the copolymer has suitable viscoelasticity. For that reason, in view of the fact that such a thermoplastic elastomer is included in the interlayer, suitable sound insulating properties are revealed.

Furthermore, by forming an interlayer having the layer B containing a thermoplastic elastomer as an internal layer and a layer A and C serving as an adhesive layer as each of outermost layers, an interlayer film for laminated glass having improved sound insulating properties while improving adhesion to a glass can be provided.

In addition to the above, in the two or more thermoplastic elastomers having a different peak temperature of tan δ from each other, which are included in the layer B containing a thermoplastic elastomer, a difference in the peak temperature of tan δ is preferably about 5° C. or more, or about 10° C. or more, or about 15° C. or more. When the difference in the peak temperature of tan δ is less than about 5° C., a width of the temperature range where the loss factor is about 0.2 or more is narrow, so that the sound insulating properties over a broad temperature range tend to be hardly revealed.

Furthermore, in the interlayer of the present invention, when the layer B containing a thermoplastic elastomer is composed of two or more layers, a difference between the peak temperature of tan δ of the thermoplastic elastomer to be contained in at least one layer B and the peak temperature of tan δ of the thermoplastic elastomer to be contained in the other layer B is preferably about 5° C. or more, or about 10° C. or more, or about 15° C. or more. When the difference in the peak temperature of tan δ between the thermoplastic elastomers to be contained in the at least two layers B is less than about 5° C., a width of the temperature range where the loss factor is about 0.2 or more is narrow, so that the sound insulating properties over a broad temperature range tend to be hardly revealed.

In the layer B which is used in the present invention, a height of at least one peak of tan δ as measured by conducting a complex shear viscosity test under a condition at a frequency of 1 Hz in accordance with HS K 7244-10 is preferably about 0.5 or more, or about 0.75 or more, or about 0.8 or more. In addition, from the viewpoint of further improving the sound insulating properties, in the layer B, the height of the peak at which the tan δ is maximum is preferably about 1.0 or more, or about 1.3 or more, or about 1.5 or more. In the layer B, when the height of the peak of tan δ is less than about 0.5, the sound insulating properties of the resulting intermediate film for laminated glass tend to become low.

As a method of regulating the height of the peak of tan δ in the resin to be contained in the layer B to about 0.5 or more, there are, for example, exemplified a method of using a thermoplastic elastomer having a content of a hard segment (for example, an aromatic vinyl polymer block) of about 40% by mass or less, or about 30% by mass or less, relative to the total amount of block copolymers (for example, a block copolymer having an aromatic vinyl polymer block and an aliphatic unsaturated hydrocarbon polymer block); a method of using a thermoplastic elastomer having a soft segment in which a ratio of a branched diene (for example, isoprene) component in copolymerization of a linear diene (for example, butadiene) and a branched diene (isoprene) is about 10% by mass or more, or about 30% by mass or more; a method of using a thermoplastic elastomer having a soft segment in which a ratio of a content of a 1,2-bond relative to a sum total of a content of a 1,4-bond and a content of a 1,2-bond in a diene monomer is about 20 mol % or more, or about 40 mol % or more; and besides, a method of adjusting the kinds of monomers constituting a hard segment or a soft segment, polymer linkages and crosslinking, glass transition temperatures of the respective segments per se, and the like; and the like.

From the viewpoint of further improving the sound insulating properties, the glass transition temperature of the resin to be contained in the layer B is preferably about 10° C. or lower, or about −5° C. or lower. A lower limit of the glass transition temperature of the resin to be contained in the layer B is not particularly limited, and the glass transition temperature of the resin to be contained in the layer B is preferably about −50° C. or higher, or about −40° C. or higher. Differential scanning calorimetry (DSC) may be adopted for the measurement method of glass transition temperature.

From the viewpoint of preparing a laminated glass in which a time-dependent change of sound insulating properties is small or preparing a laminate with excellent sound insulating properties over a broad temperature range, a shear storage modulus of the layer B which is used in the present invention (or the resin to be contained in the layer B) at a temperature of 25° C. as measured by conducting a complex shear viscosity test at a frequency of 1 Hz in accordance with JIS K 7244-10 is preferably about 0.1 MPa or more, or about 0.2 MPa or more, or about 0.3 MPa or more. In addition, from the above-described viewpoint, the shear storage modulus of the layer B is preferably about 5.0 MPa or less, or about 4.0 MPa or less, or about 3.0 MPa or less, or about 1.0 MPa or less, or about 0.8 MPa or less, or about 0.6 MPa or less. When the shear storage modulus of the layer A is less than about 0.1 MPa, there is a concern that handling properties in producing the laminate are deteriorated, or unevenness of film thickness is caused. In addition, when the shear storage modulus of the layer B is more than about 5.0 MPa, a damping performance as the intermediate film for laminated glass becomes low, so that the function as a sound insulating film tends to be lowered.

The layer B in which the shear storage modulus is about 0.1 MPa or more and about 5.0 MPa or less can be, for example, obtained by a method of adjusting the content of the hard segment (for example, an aromatic vinyl polymer block) by selecting, as the resin to be contained in the layer B, a thermoplastic elastomer that is a resin constituted of a hard segment and a soft segment, as a block copolymer, with a content of the hard segment being about 5% by mass or more and about 30% by mass or less; or a method of adjusting the kinds of monomers constituting a hard segment or a soft segment, polymer linkages and crosslinking, glass transition temperatures of the respective segments per se, and the like.

Furthermore, from the viewpoint of preparing a laminated glass in which a lowering of sound insulating performance in a high-frequency region to be caused due to a coincidence phenomenon is suppressed and which is excellent in sound insulating properties, a shear storage modulus of the layer B which is used in the present invention (or the resin to be contained in the layer B) at a temperature of 25° C. as measured by conducting a complex shear viscosity test at a frequency of 1 Hz in accordance with JIS K 7244-10 is preferably about 0.6 MPa or more, or about 0.8 MPa or more, or about 1.0 MPa or more, In addition, from the above-described viewpoint, the shear storage modulus of the layer B is preferably about 3.0 MPa or less, or about 2.0 MPa or less, or about 1.5 MPa. or less. When the shear storage modulus of the layer B is less than about 0.6 MPa, the rigidity of the laminate tends to be lowered. In addition, when the shear storage modulus of the layer B is more than about 3.0 MPa, the moldability or handling properties tend to be lowered.

The layer B in which the shear storage modulus is about 0.6 MPa or more and about 3.0 MPa or less can be, for example, obtained by a method of adjusting the content of the hard segment by using a block copolymer (for example, a block copolymer having an aromatic vinyl polymer block and an aliphatic unsaturated hydrocarbon polymer block) as the resin to be contained in the resin composition constituting the layer B and using a thermoplastic elastomer having a content of the hard segment (for example, an aromatic vinyl polymer block) of about 14% by mass or more and about 40% by mass or less relative to the total amount; or a method of adjusting the kinds of monomers constituting a hard segment or a soft segment, polymer linkages and crosslinking, glass transition temperatures of the respective segments per se, and the like.

Among energies generated by an external force and a strain against a body, the shear storage modulus is an index of a component stored inside the body and can be determined from a relation between dynamic modulus and temperature under a constant heating rate in measurement temperature in a strain control type dynamic viscoelasticity instrument.

Though the measurement condition of the shear storage modulus can be properly set, for example, the measurement can be conducted by setting at a frequency of 1 Hz and at a temperature of −40° C. to 100° C. A test system in JIS K 7244-10 includes a stress control system and a strain control system.

A parallel-plate oscillatory rheometer can be used for a testing instrument in JIS K 7244-10. The parallel-plate oscillatory rheometer is constituted of two coaxial rigid parallel disks. The dynamic viscoelastic characteristics, such as a shear loss modulus, a shear storage modulus, can be measured by placing a test sheet between the disks and fixing one of the disks and vibrating the other disk at a fixed frequency.

A diameter of the disk is generally 20 mm or more and 50 mm or less, and a thickness of the test sheet is defined as a distance between the disks. In order to minimize a measurement error, it is desired to use a test sheet of about 3 g or more and 5 g or less and allow the thickness of the test sheet to fall within the range of 0.5 mm or more and 3 mm or less. In addition, a ratio of the diameter of the disk to the thickness of the test sheet is desirably in the range of 10 or more and 50 or less. The test sheet is formed in a disk shape by means of injection molding, compression molding, or cutting-out from the sheet. Besides, a pellet, a liquid, or a molten polymer may be filled between the disks. In addition, a gap between the two flat plates is completely filled by the test sheet.

In the strain control system, distortion of a sinusoidal waveform at a fixed angular frequency is applied, and a sinusoidal torque and a phase difference between torque and angular displacement generated as a result are measured. A torque measurement instrument is connected to the flat plate of one side, and a torque necessary for deforming the test sheet is measured. An angular displacement measurement instrument is connected to the flat plate on the movable side, and an angular displacement and a frequency are measured. Either a torque of sinusoidal waveform or an angular displacement is given to the test sheet at a fixed frequency, and the shear loss modulus and the shear storage modulus are determined from the measured torque and displacement and the test sheet dimension.

In addition, it is necessary to heat a testing instrument to the testing temperature, thereby rendering the testing instrument in a thermal equilibrium state. It is desired that the testing temperature is measured by bringing a thermometer into contact with the disk on the immobile side or burying the thermometer in the disk on the immobile side. Heating is conducted by means of forced convection, high-frequency heating, or an appropriate method. The test sheet and the disk are thoroughly held until the testing instrument reaches the thermal equilibrium state at the testing temperature such that measured values of the shear loss modulus and the shear storage modulus do not change. An equilibrium time is desirably 15 minutes or more and 30 minutes or less.

From the viewpoint of making both the moldability and the sound insulating properties compatible with each other, the resin to be used in the layer B is a thermoplastic elastomer (sometimes referred to simply as "elastomer"). Examples of suitable thermoplastic elastomers include a polystyrene-based elastomer (soft segment: polybutadiene, polyisoprene/hard segment: polystyrene), a polyolefin-based elastomer (soft segment: ethylene propylene rubber/hard segment: polypropylene), a polyvinyl chloride-based elastomer (soft segment: polyvinyl chloride/hard segment: polyvinyl chloride), a polyurethane-based elastomer (soft segment: polyether, polyester, or polycarbonate/hard segment: polyurethane), a polyester-based elastomer (soft segment: aliphatic polyester/hard segment: aromatic polyester), a polyether ester-based elastomer (soft segment: polyether/hard segment: polyester), a polyamide-based elastomer (soft segment: polypropylene glycol, polytetramethylene ether glycol, polyester, or polyether/hard segment: polyamide (such as a nylon resin)), a polybutadiene-based elastomer (soft segment: amorphous butyl rubber/hard segment: syndiotactic 1,2-polybutadiene resin), an acrylic elastomer (soft segment: polyacrylate ester/hard segment: polymethyl methacrylate). It is to be noted that the above-described thermoplastic elastomers may be used solely or may be used in combination of two or more thereof.

A content of the hard segment in the thermoplastic elastomer is preferably about 5% by mass or more, or about 7% by mass or more, or about 8% by mass or more, or about 10% by mass or more, or about 14% by mass or more, or about 16% by mass or more, or about 18% by mass or more, relative to the total amount of the thermoplastic elastomer. A content of the hard segment is preferably about 40% by mass or less, or about 30% by mass or less, or about 20% by mass or less, relative to the total amount of the thermoplastic elastomer. When the content of the hard segment is less than about 5% by mass, there is a tendency that the molding of the layer B is difficult, the height of the peak of tan δ is small, the flexural rigidity of the laminate is small, or the sound insulating properties in a high-frequency region is lowered. When the content of the hard segment is more than about 40% by mass, there is a tendency that the characteristics as the thermoplastic elastomer are hardly exhibited, the stability of sound insulating performance is lowered, or the sound insulating characteristics in the vicinity of room temperature are lowered.

A content of the soft segment in the thermoplastic elastomer is preferably about 60% by mass or more, or about 70% by mass or more, or about 80% by mass or more, relative to the total amount of the thermoplastic elastomer. The content of the soft segment is preferably about 95% by mass or less, or about 92% by mass or less, or about 90% by mass or less, or about 88% by mass or less, or about 86% by mass or less, or about 84% by mass or less, or about 82% by mass or less relative to the total amount of the thermoplastic elastomer. When the content of the soft segment is less than about 60% by mass, the characteristics as the thermoplastic elastomer tend to be hardly exhibited. When the content of the soft segment is more than about 95% by mass, there is a tendency that the molding of the layer B is difficult, the height of the peak of tan δ is small, the flexural rigidity of the laminate is small, or the sound insulating properties in a high-frequency region are lowered. Here, in the case where a plurality of the thermoplastic elastomers is mixed, the contents of the hard segment and the soft segment in the thermoplastic elastomer are each considered as an average value of the mixture.

From the viewpoint of making both the moldability and the sound insulating properties compatible with each other, it is more preferred to use a block copolymer having a hard segment and a soft segment as the thermoplastic elastomer. Furthermore, from the viewpoint of further improving the sound insulating properties, it is preferred to use a polystyrene-based elastomer.

In addition, crosslinked rubbers of natural rubber, isoprene rubber, butadiene rubber, chloroprene rubber, nitrile rubber, butyl rubber, ethylene propylene rubber, urethane rubber, silicone rubber, chlorosulfonated polyethylene rubber, acrylic rubber, fluorine rubber, and the like may be used as the thermoplastic elastomer.

The thermoplastic elastomer is preferably a copolymer of an aromatic vinyl monomer and a vinyl monomer or a conjugated diene monomer, or a hydrogenated product of the copolymer. From the viewpoint of making both the function as a rubber exhibiting sound insulating properties and the function as a plastic compatible with each other, the copolymer is preferably a block copolymer having an aromatic vinyl polymer block and an aliphatic unsaturated hydrocarbon polymer block, for example, a polystyrene-based elastomer.

In the case where a copolymer having an aromatic vinyl polymer block and a vinyl polymer block or a conjugated diene polymer block, for example, a block copolymer having an aromatic vinyl polymer block and an aliphatic unsaturated hydrocarbon polymer block is used as the thermoplastic elastomer, the binding form of these polymer blocks is not particularly limited, and it may be any of a linear binding form, a branched binding form, a radial binding form, and a combined binding form of two or more thereof. Of those, a linear binding form is preferred.

When the aromatic vinyl polymer block is expressed as "a", and the aliphatic unsaturated hydrocarbon polymer block is expressed as "b", examples of the linear binding form include a diblock copolymer expressed by a-b, a triblock copolymer expressed by a-b-a or b-a-b, a tetrablock copolymer expressed by a-b-a-b, a pentablock copolymer expressed by a-b-a-b-a or b-a-b-a-b, an $(a\text{-}b)_n X$ type copolymer (X represents a coupling residual group, and n represents an integer of 2 or more), and a mixture thereof. Of those, a diblock copolymer or a triblock copolymer is preferred, and the triblock copolymer is more preferably a triblock copolymer expressed by a-b-a.

A sum total of an aromatic vinyl monomer unit and an aliphatic unsaturated hydrocarbon monomer unit in the block copolymer is preferably about 80% by mass or more, or about 95% by mass or more, or about 98% by mass or more relative to the whole of the monomer units. It is to be noted that a part or the whole of the aliphatic unsaturated hydrocarbon polymer blocks in the block copolymer may be hydrogenated.

A content of the aromatic vinyl monomer unit in the block copolymer is preferably about 5% by mass or more, or about 7% by mass or more, or about 8% by mass or more, or about 14% by mass or more, or about 16% by mass or more, or about 18% by mass or more, relative to the whole of the monomer units of the block copolymer. A content of the aromatic vinyl monomer unit is preferably about 40% by mass or less, or about 30% by mass or less, or about 25% by mass or less, or about 20% by mass or less, relative to the whole of the monomer units of the block copolymer.

When the content of the aromatic vinyl monomer unit in the block copolymer is less than about 5% by mass, there is a tendency that the molding of the layer A is difficult, a deviation of glasses is caused due to heat, the height of the peak of tan δ is small, the flexural rigidity of the laminate is small, or the sound insulating properties in a high-frequency region are lowered. When the content of the aromatic vinyl monomer unit in the block copolymer is more than about 40% by mass, there is a tendency that the characteristics as the thermoplastic elastomer are hardly exhibited, or the stability of sound insulating performance is lowered.

The content of the aromatic vinyl monomer unit in the block copolymer can be determined from a charge ratio of the respective monomers in synthesizing the block copolymer, or the measurement results of $^1$H-NMR or the like of the block copolymer. In the Examples of the present specification, a proportion of the monomer species was determined from the measurement results of $^1$H-NMR, and the proportion of each monomer was described in terms of % by mass. Here, in the case where a plurality of the block copolymers is mixed, the content of the aromatic vinyl monomer unit in the block copolymer is considered as an average value of the mixture.

In the aromatic vinyl polymer block, a monomer other than the aromatic vinyl monomer may be copolymerized so long as its amount is small. A proportion of the aromatic vinyl monomer unit in the aromatic vinyl polymer block is preferably about 80% by mass or more, or about 95% by mass or more, or about 98% by mass or more relative to the whole of the monomer units in the aromatic vinyl polymer block.

Examples of the aromatic vinyl monomer constituting the aromatic vinyl polymer block include styrene; alkyl styrenes, such as α-methylstyrene, 2-methylstyrene, 3-methylstyrene, 4-methylstyrene, 4-propylstyrene, 4-cyclohexylstyrene and 4-dodecylstyrene; arylstyrenes, such as 2-ethyl-4-benzylstyrene, 4-(phenylbutyl)styrene, 1-vinylnaphthalene and 2-vinylnaphthalene; halogenated styrenes; alkoxystyrenes; vinylbenzoate esters; and the like. These aromatic vinyl monomers may be used solely or may be used in combination of two or more thereof.

A content of the aliphatic unsaturated hydrocarbon monomer unit in the block copolymer is preferably about 60% by mass or more, or about 70% by mass or more, or about 75% by mass or more, or 80% by mass or more, relative to the whole of the monomer units of the block copolymer. The content of the aliphatic unsaturated hydrocarbon monomer unit in the block copolymer is preferably about 95% by mass or less, or about 92% by mass or less, or about 90% by mass or less, or about 88% by mass or less, or about 86% by mass or less, or about 84% by mass or less, or about 82% by mass or less, relative to the whole of the monomer units of the block copolymer.

When the content of the aliphatic unsaturated hydrocarbon monomer unit in the block copolymer is less than about 60% by mass, there is a tendency that the characteristics as the thermoplastic elastomer are hardly exhibited, or the stability of sound insulating performance is lowered. When the content of the aliphatic unsaturated hydrocarbon monomer unit in the block copolymer is more than about 95% by mass, there is a tendency that the molding of the layer B is difficult, the height of the peak of tan δ is small, the flexural rigidity of the laminate is small, or the sound insulating properties in a high-frequency region are lowered.

The content of the aliphatic unsaturated hydrocarbon monomer unit in the block copolymer can be determined from a charge ratio of the respective monomers in synthesizing the block copolymer, or the measurement results of $^1$H-NMR or the like of the block copolymer. In the Examples of the present specification, a proportion of the monomer species was determined from the measurement results of $^1$H-NMR, and the proportion of each monomer was described in terms of % by mass. Here, in the case where a plurality of the block copolymers is mixed, the content of the aliphatic unsaturated hydrocarbon monomer unit in the block copolymer is considered as an average value of the mixture.

In the aliphatic unsaturated hydrocarbon polymer block, a monomer other than the aliphatic unsaturated hydrocarbon monomer may be copolymerized so long as its amount is small. A proportion of the aliphatic unsaturated hydrocarbon monomer unit in the aliphatic unsaturated hydrocarbon polymer block is preferably about 80% by mass or more, or about 95% by mass or more, or about 98% by mass or more, relative to the whole of the monomer units in the aliphatic unsaturated hydrocarbon polymer block.

Examples of the aliphatic unsaturated hydrocarbon monomer constituting the aliphatic unsaturated hydrocarbon polymer block include ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, butadiene, isoprene, dicyclopentadiene, norbornene, acetylene, and the like. These aliphatic unsaturated hydrocarbon monomers may be used solely or may be used in combination of two or more thereof.

From the viewpoints of ease of availability and handling properties, the aliphatic unsaturated hydrocarbon monomer is preferably an aliphatic unsaturated hydrocarbon having 2 or more carbon atoms, or an aliphatic hydrocarbon having 4 or more carbon atoms, and is preferably an aliphatic unsaturated hydrocarbon having 12 or less carbon atoms, or an aliphatic hydrocarbon having 8 or less carbon atoms. Among those, butadiene, isoprene, and a combination of butadiene and isoprene are preferred.

In addition, from the viewpoints of easiness of availability and handling properties as well as easiness of synthesis, the aliphatic unsaturated hydrocarbon monomer is preferably a conjugated diene. From the viewpoint of improving the heat stability, in the case of using a conjugated diene as the constituent unit of the aliphatic unsaturated hydrocarbon polymer block, the conjugated diene is preferably a hydrogenated product resulting from hydrogenating a part or the whole thereof. On that occasion, a hydrogenation ratio is preferably 80% or more, or 90% or more. The hydrogenation ratio as referred to herein is a value obtained by measuring an iodine value of the block copolymer before and after the hydrogenation reaction.

From the viewpoints of mechanical characteristics and molding processability, a weight average molecular weight of the block copolymer is preferably about 30,000 or more, or about 50,000 or more and preferably about 400,000 or less, or about 300,000 or less. A ratio (Mw/Mn) of weight average molecular weight to number average molecular weight of the block copolymer is preferably about 1.0 or more, and preferably about 2.0 or less, or about 1.5 or less. Here, the weight average molecular weight refers to a weight average molecular weight as reduced into polystyrene as determined by the gel permeation chromatography (GPC)

measurement, and the number average molecular weight refers to a number average molecular weight as reduced into polystyrene as determined by the GPC measurement.

Though a production method of the block copolymer is not particularly limited, the block copolymer can be, for example, produced by an anionic polymerization method, a cationic polymerization method, a radical polymerization method, or the like. For example, in the case of anionic polymerization, specific examples thereof include:

(i) a method of successively polymerizing an aromatic vinyl monomer, a conjugated diene monomer, and subsequently an aromatic vinyl monomer by using an alkyllithium compound as an initiator;
(ii) a method of successively polymerizing an aromatic vinyl monomer and a conjugated diene monomer by using an alkyllithium compound as an initiator and subsequently adding a coupling agent to undergo coupling;
(iii) a method of successively polymerizing a conjugated diene monomer and subsequently an aromatic vinyl monomer by using a dilithium compound as an initiator; and the like.

In the case of using a conjugated diene as the aliphatic unsaturated hydrocarbon monomer, by adding an organic Lewis base on the occasion of anionic polymerization, a 1,2 bond quantity and a 3,4-bond quantity of the thermoplastic elastomer can be increased, and the 1,2-bond quantity and the 3,4-bond quantity of the thermoplastic elastomer can be easily controlled by the addition amount of the organic Lewis base. By controlling them, the peak temperature or height of tan δ can be adjusted.

Examples of the organic Lewis base include esters, such as ethyl acetate; amines, such as triethylamine, N,N,N',N'-tetramethylethylenediamine (TMEDA) and N-methylmorpholine; nitrogen-containing heterocyclic aromatic compounds, such as pyridine; amides, such as dimethylacetamide; ethers, such as dimethyl ether, diethyl ether, tetrahydrofuran (THF) and dioxane; glycol ethers, such as ethylene glycol dimethyl ether and diethylene glycol dimethyl ether; sulfoxides, such as dimethyl sulfoxide; ketones, such as acetone and methyl ethyl ketone; and the like.

In the case of subjecting the unhydrogenated polystyrene-based elastomer to a hydrogenation reaction, the hydrogenation reaction can be conducted by dissolving the obtained unhydrogenated polystyrene-based elastomer in a solvent inert to a hydrogenation catalyst, or allowing the unhydrogenated polystyrene-based elastomer to react directly with hydrogen without being isolated from a reaction liquid in the presence of a hydrogenation catalyst. The hydrogenation ratio is preferably about 60% or more, or about 80% or more, or about 90% or more.

Examples of the hydrogenation catalyst include Raney nickel; heterogeneous catalysts in which a metal, such as Pt, Pd, Ru, Rh and/or Ni, is supported on a carrier, such as carbon, alumina and/or diatomaceous earth; Ziegler-based catalysts composed of a combination of a transition metal compound with an alkylaluminum compound and/or an alkyllithium compound; metallocene-based catalysts; and the like. The hydrogenation reaction can be generally conducted under conditions at a hydrogen pressure of about 0.1 MPa or more and about 20 MPa or less and at a reaction temperature of about 20° C. or higher and about 250° C. or lower for a reaction time of about 0.1 hours or more and about 100 hours or less.

In a preferred embodiment, the thermoplastic elastomer has a sea-island phase separated structure in which the hard segment block is included as an island component and the soft segment block is included as a sea component. It has been found that the phase separation size of an island component is sometimes increased in a layer to be used in an interlayer for a laminated glass, and therefore, the interlayer for a laminated glass shrinks when producing a laminated glass or the haze of the laminated glass is decreased, and also found that a laminated glass using an interlayer for a laminated glass having a specific structure has excellent sound insulating properties even when the thickness is reduced and also has low shrinkability.

More specifically in this embodiment, the thermoplastic elastomer includes a hard segment block and a soft segment block, and the layer B has a sea-island phase separated structure in which the hard segment block is included as an island component and the soft segment block is included as a sea component, and when the degree of orientation (1) is defined by the following formula (i) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement, the degree of orientation (1) is about 0.9 or less.

Degree of orientation (1)=(maximum intensity value−minimum intensity value)/(maximum intensity value+minimum intensity value)    (i)

It is preferred that the degree of orientation (2), as defined by the following formula (ii), is about 10 or less.

Degree of orientation (2)=maximum intensity value/minimum intensity value    (ii)

It is also preferred that, when an island component having a largest major axis size is selected from the island components having a substantially elliptical shape or a substantially continuous linear shape in each phase image obtained by observation with an atomic force microscope of a region in the range of 200 nm×200 nm at arbitrary 5 sites on a sliced surface obtained by slicing a central area in the thickness direction of the layer B along a plane substantially parallel to the layer B, the average of the major axis size of the selected island components is about 100 nm or less.

Specific examples of suitable thermoplastic elastomers can be found, for example, by reference to US2010239802A1.

In one preferred embodiment, the thermoplastic elastomer is a hydrogenated block copolymer formed by hydrogenating a block copolymer comprising at least a polymer block (A) constituted predominantly from an aromatic vinyl compound unit and a polymer block (B) constituted predominantly from a 1,3-butadiene unit or constituted predominantly from an isoprene unit and a 1,3-butadiene unit, wherein a content of the polymer block (A) is from about 5% to about 40% mass on the basis of a total amount of the hydrogenated block copolymer, wherein the polymer block (B) has a hydrogenation rate of about 70% or more, and wherein the hydrogenated block copolymer has a glass transition temperature of from about −45° C. to about 30° C.

In another preferred embodiment, the thermoplastic elastomer is a hydrogenated block copolymer formed by hydrogenating a block copolymer comprising at least a polymer block (C) constituted predominantly from an aromatic vinyl compound unit and a polymer block (D) constituted predominantly from a 1,3-butadiene unit or constituted predominantly from an isoprene unit and a 1,3-butadiene unit, wherein a content of the polymer block (C) is from about 10% to about 40% mass on the basis of a total amount of the hydrogenated block copolymer, wherein the polymer block (D) has a hydrogenation rate of about 80% or more, and wherein the hydrogenated block copolymer has a glass transition temperature of less than about −45° C.

In the above two preferred embodiments, desirably the aromatic vinyl compound is styrene, and/or the polymer block (B) and (D) are constituted predominantly from an isoprene unit and a 1,3-butadiene unit, and/or the hydrogenated block copolymer is a tri-block copolymer having an A1-B-A2 or C1-D-C2 type structure.

In the layer B, an antioxidant, an ultraviolet ray absorber, a photostabilizer, an antiblocking agent, a pigment, a dye, a heat shielding material, an adhesion modifier and the like, or mixtures thereof, may be added as other components, if desired. Examples of the antioxidant, the ultraviolet ray absorber, the photostabilizer and the adhesion modifier include those to be contained in the layer B as described later.

When, for example, an inorganic heat shielding fine particle or a heat shielding compound as the heat shielding material is incorporated into the layer B to give a heat shielding function to the laminate, thereby forming a laminated glass, a transmittance at a wavelength of 1,500 nm can be regulated to about 50% or less. The heat shielding material is described later in detail.

In the case where a component other than the thermoplastic elastomer is contained in the layer B, in the composition containing the thermoplastic elastomer constituting the layer B, the content of the thermoplastic elastomer component is preferably about 60% by mass or more, or about 70% by mass or more, or about 80% by mass or more, or about 90% by mass or more, or about 95% by mass or more. When the content of the thermoplastic elastomer in the layer B is less than about 60% by mass, there is a tendency that the characteristics as the thermoplastic elastomer are hardly exhibited, or the optical characteristics are impaired.

Advantageously, no plasticizer is required for the thermoplastic elastomer of layer B, and the disadvantages of plasticizer migration as described above are avoided. In such case, layer B is considered to be substantially plasticizer free (consist essentially of no plasticizer for the resin).

In the interlayer of the present invention, the thermoplastic elastomer is contained in an amount of preferably about 5% by mass or more, or about 10% by mass or more, or about 13% by mass or more based on the total mass of the interlayer. When the content of the thermoplastic elastomer in the interlayer is less than about 5% by mass, the sound insulating properties tend to be lowered.

Skin Layers

In the skin layers which are used for the interlayer of the present invention, a shear storage modulus at a temperature of 25° C. as measured by conducting a complex shear viscosity test at a frequency of 1 Hz in accordance with JIS K 7244-10 is preferably about 1 MPa or more, and or about 2 MPa or more. When the shear storage modulus at a temperature of 25° C. is less than about 1 MPa, there is a tendency that stickiness of the skin layer increases, and the processing window in a production process of a laminated glass are lowered.

Furthermore, in the case where it is necessary to compensate for a lowering of strength of the laminated glass following thinning (weight reduction) of glass, the shear storage modulus at a temperature of 25° C. is preferably about 10.0 MPa or more. For example, by using a skin layer whose shear storage modulus at a temperature of 25° C. is about 10.0 MPa or more as an outermost layer, a interlayer with excellent handling properties can be obtained. The shear storage modulus at a temperature of 2.5° C. is preferably about 12.0 MPa or more, or about 20.0 MPa or more, or about 40.0 MPa or more, or about 60.0 MPa or more, or about 80.0 MPa or more. When the shear storage modulus under the above-described condition is less than about 10.0 MPa, there is a tendency that suitable shear storage modulus and maximum loss factor cannot be kept, and the sound insulating properties or flexural rigidity of the intermediate film for laminate glass is lowered. The skin layer having a shear storage modulus of about 10.0 MPa or more can be, for example, obtained by regulating an amount of a plasticizer to about 50 parts by mass or less based on 100 parts by mass of a thermoplastic resin, such as a polyvinyl acetal resin. In addition, an upper limit of the shear storage modulus at 25° C. is not particularly limited, and it is preferably about 900 MPa or less from the viewpoints of moldability and handling properties of the laminate.

In the interlayers of the present invention, it is preferred that the skin layer serving as the outermost layer contains at least one thermoplastic resin selected from the group consisting of a polyvinyl acetal resin, an ionomer, an ethylene-vinyl acetate copolymer, and an adhesive functional group-containing polyolefin. A general description and examples of these thermoplastic resins can be had by reference to previously incorporated to PCT/JP2015/81664, PCT/JP2015/81665, PCT/JP2015/81666, PCT/JP2015/81667 and PCT/JP2015/81668.

When the skin layer is constituted of a composition containing the above-described thermoplastic resin, the weather resistance or strength of the intermediate film for laminated glass can be improved, or the flexural strength or penetration resistance of the resulting laminated glass can be improved.

In addition, as for the skin layer of the present invention, in interposing the laminate of the present invention between two sheets of float glass having a length of 300 mm, a width of 25 mm, and a thickness of 1.9 mm, the laminate is selected in such a manner that a loss factor at a quaternary resonance frequency as measured at 20° C. by a central exciting method is about 0.2 or more, and a flexural rigidity at the quaternary resonance frequency as calculated in accordance with ISO 16940 (2008) is about 150 N·m or more. The resin satisfying such prescriptions is not particularly limited, and examples thereof include the above-described thermoplastic resins and the like.

Furthermore, it is preferred that the resin which is used for the skin layer of the present invention includes a resin having adhesion to a glass. The resin having such properties is not particularly limited, and examples thereof include the above-described thermoplastic resins and the like.

In the skin layers A and C, as a component other than the thermoplastic resin, such as the polyvinyl acetal resin, a plasticizer, an antioxidant, an ultraviolet ray absorber, a photostabilizer, an adhesion modifier, an antiblocking agent, a pigment, a dye, a heat shielding material (for example, an inorganic heat shielding fine particle or an organic heat shielding material each having infrared absorption ability), and the like may be added, if desired. Such additives are described in further detail below.

Advantageously, when an ionomer is used, no plasticizer is required, and the disadvantages of plasticizer migration as described above are avoided. In such case, skin layers A and/or C are considered to be substantially plasticizer free (consist essentially of no plasticizer for the resin). When in addition there is no plasticizer in acoustic layer B, the interlayer as a whole can be substantially plasticizer free (consist essentially of no plasticizer for the interlayer).

Terpolymer Ionomer

As indicated above, at least one (and preferably both) of skin Layer A and skin Layer C are a specific type of terpolymer ionomer, which is an at least partially neutralized ethylene acid copolymer preferably comprising copolymerized units of:
(i) ethylene,
(ii) from about 10 wt %, or from about 15 wt %, or from about 18 wt %, or from about 20 wt %, to about 30 wt %, or to about 25 wt %, or to about 23 wt % or to about 22 wt %, of at least one α,β-unsaturated carboxylic acid having 3 to 10 carbon atoms,
(iii) from about 2 wt %, or from about 3 wt %, or from about 4 wt %, or from about 5 wt %, to about 15 wt %, or to about 12 wt %, or to about 11 wt %, or to about 10 wt %, of at least one α,β-unsaturated carboxylic acid ester having 3 to 10 carbon atoms, and
(iv) optionally a derivative of an α,β-unsaturated carboxylic acid other than (iii) in an amount such that (iii)+(iv) is about 15 wt % or less, or about 12 wt % or less, or about 11 wt % or less, wherein the weight percentages of the copolymerized units are based on the total weight of the ethylene acid copolymer and the sum of the weight percentages of the copolymerized units is 100 wt %, and wherein at least a portion of carboxylic acid groups of the α,β-unsaturated carboxylic acid are neutralized to form an ionomer comprising carboxylate groups having counterions.

Such ionomers are generally disclosed in WO2015/199750A1 and WO2014/100313A1.

Suitable first α,β-ethylenically unsaturated acid comonomers include, without limitation, acrylic acid, methacrylic acid, itaconic acid, maleic acid, fumaric acid, and mixtures of two or more thereof. In one preferred copolymer, the α,β-ethylenically unsaturated carboxylic acid is selected from acrylic acid, methacrylic acid, and mixtures of two or more thereof. In another preferred copolymer, the α,β-ethylenically unsaturated carboxylic acid is methacrylic acid.

The ethylene acid copolymer further comprises copolymerized units of one or more additional comonomer(s), such as an α,β-ethylenically unsaturated carboxylic acid ester. Alkyl esters having 3 to 10, or preferably 3 to 8 carbons, are preferred. Specific examples of preferred esters of unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, dimethyl maleate, diethyl maleate, dibutyl maleate, dimethyl fumarate, diethyl fumarate, dibutyl fumarate, dimethyl fumarate, vinyl acetate, vinyl propionate, and mixtures of two or more thereof. In one preferred copolymer, the suitable additional comonomers are selected from methyl acrylate, methyl methacrylate, n-butyl acrylate, n-butyl methacrylate, isobutyl acrylate, isobutyl methacrylate, glycidyl methacrylate, vinyl acetate, and mixtures of two or more thereof. In a more preferred embodiment, the suitable additional comonomers is one or more of n-butyl acrylate, n-butyl methacrylate, isobutyl acrylate and isobutyl methacrylate, and still more preferably one or both of n-butyl acrylate and isobutyl acrylate.

Suitable ethylene acid copolymers have a melt flow rate (MFR) of from about 1, or from about 2, to about 4000 g/10 min, or to 1000 g/10 min, or to about 400 g/10 min, as determined in accordance with ASTM method D1238-89 at 190° C. and 2.16 kg.

Finally, suitable ethylene acid copolymers may be synthesized as described in U.S. Pat. Nos. 3,404,134, 5,028,674, 6,500,888, 6,518,365, 8,334,033 or 8,399,096, for example. In one embodiment, a method described in U.S. Pat. No. 8,399,096 is used, and a sufficiently high level and complementary amount of the derivative of the second α,β-ethylenically unsaturated carboxylic acid is present in the reaction mixture.

To obtain the ionomers, the ethylene acid copolymers are partially neutralized by reaction with one or more bases. An example of a suitable procedure for neutralizing the ethylene acid copolymers is described in U.S. Pat. Nos. 3,404,134 and 6,518,365. After neutralization, about 1%, or about 10%, or about 15%, or about 20%, to about 90%, or to about 60%, or to about 55%, or to about 30%, of the hydrogen atoms of carboxylic acid groups present in the ethylene acid copolymer are replaced by other cations. Stated alternatively, about 1%, or about 10%, or about 15%, or about 20%, to about 90%, or to about 60%, or to about 55%, or to about 30%, of the total content of the carboxylic acid groups present in the ethylene acid copolymer are neutralized. In another alternative expression, the acid groups are neutralized to a level of about 1%, or about 10%, or about 15%, or about 20%, to about 90%, or to about 60%, or to about 55%, or to about 30%, based on the total content of carboxylic acid groups present in the ethylene acid copolymers as calculated or measured for the non-neutralized ethylene acid copolymers. The neutralization level can be tailored for the specific end-use.

The ionomers comprise cations as counterions to the carboxylate anions. Suitable cations include any positively charged species that is stable under the conditions in which the ionomer composition is synthesized, processed and used. Suitable cations may be used in combinations of two or more. In some preferred ionomers, the cations are metal cations, which may be monovalent, divalent, trivalent, or multivalent. Useful monovalent metal cations include but are not limited to cations of sodium, potassium, lithium, silver, mercury, copper, and the like. Useful divalent metal cations include but are not limited to cations of beryllium, magnesium, calcium, strontium, barium, copper, cadmium, mercury, tin, lead, iron, cobalt, nickel, zinc, and the like. Useful trivalent metal cations include but are not limited to cations of aluminum, scandium, iron, yttrium, and the like. Useful multivalent metal cations include but are not limited to cations of titanium, zirconium, hafnium, vanadium, tantalum, tungsten, chromium, cerium, iron, and the like. When the metal cation is multivalent, complexing agents such as stearate, oleate, salicylate, and phenolate radicals may be included, as described in U.S. Pat. No. 3,404,134. In another preferred composition, the metal cations used are monovalent or divalent metal cations. Preferred metal cations are sodium, lithium, magnesium, zinc, potassium, and combinations of one or more of these metal cations. In a more preferred composition, the cations are sodium cations, magnesium cations, zinc cations and combinations thereof.

The resulting neutralized ionomer has a melt index, as determined in accordance with ASTM method D1238-89 at 190° C. and 2.16 kg, that is lower than that of the corresponding ethylene acid copolymer. The ionomer's melt index depends on a number of factors, including the melt index of the ethylene acid copolymer, the amount of copolymerized acid, the neutralization level, the identity of the cation and its valency. Moreover, the desired value of the ionomer's melt index may be determined by its intended end use. Preferably, however, the ionomer has a melt index of about 1000 g/10 min or less, or about 750 g/10 min or less, or about 500 g/10 min or less, or about 250 g/10 min or less, or about 100 g/10 min or less, or about 50 g/10 min or less, or about 25 g/10 min or less, or about of 20 g/10 min or less, or about 10 g/10 min or less, or about 7.5 g/10 min or less, as determined in accordance with ASTM method D1238-89 at 190° C. and 2.16 kg.

Additives

Typical additives for the various layers of the multilayer laminates include antioxidants, ultraviolet ray absorbers, photo stabilizers, adhesion modifiers and heat-shielding materials (infrared ray absorbers).

Examples of the antioxidant include phenol-based antioxidants, phosphorus-based antioxidants, sulfur-based antioxidants, and the like. Of those, phenol-based antioxidants are preferred, and alkyl-substituted phenol-based antioxidants are especially preferred.

Examples of the phenol-based antioxidant include acrylate-based compounds, such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenol-based compounds, such as 2,6-di-t-butyl-4-methylphenol, 2,6-di-t-butyl-4-ethylphenol, octadecyl-3-(3,5-di-t-butyl-4-hydroxyphenyl)propionate, 2,2'-methylene-bis(4-methyl-6-t-butylphenol), 4,4'-butylidene-bis(4-methyl-6-t-butylphenol) 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-tri(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane and triethylene glycol bis(3-(3-t-butyl-4-hydroxy-5-methylphenyl)propionate); triazine group-containing phenol-based compounds, such as 1,3,5-tris(2,6-dimethyl-3-hydroxy-4-t-butylbenzyl)-1,3,5-triazine-2,4,6(1H,3H,5H)-trione, 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine and 2-octylthio-4,6-bis-(3,5-di-t-butyl-4-oxyanilino)-1,3,5-triazine; and the like.

Examples of the phosphorus-based antioxidant include monophosphite-based compounds, such as triphenyl phosphite, diphenylisodecyl phosphite, phenyldiisodecyl phosphite, tris(nonylphenyl) phosphite, tris(dinonylphenyl) phosphite, tris(2-t-butyl-4-methylphenyl) phosphite, tris(2,4-di-t-butyl) phosphite, tris(cyclohexylphenyl) phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; diphosphite-based compounds, such as 4,4'-butylidene-bis(3-methyl-6-t-butylphenyl-di-tridecylphosphite), 4,4'-isopropylidene-bis(phenyl-di-alkyl(C12-C15) phosphite), 4,4'-isopropylidene-bis(diphenylmonoalkyl(C12-C15)phosphite), 1,1,3-tris(2-methyl-4-di-tridecylphosphite-5-t-butylphenyl)butane and tetrakis(2,4-di-t-butylphenyl)-4,4'-biphenylene phosphite; and the like. Of those, monophosphite-based compounds are preferred.

Examples of the sulfur-based antioxidant include dilauryl 3,3'-thiodipropionate, distearyl 3,3-thiodipropionate, lauryl stearyl 3,3'-thiodipropionate, pentaerythritol-tetrakis-(β-lauryl-thiopropionate), 3,9-bis(2-dodecylthioethyl)-2,4,8,10-tetraoxaspiro[5.5]undecane, and the like.

These antioxidants can be used solely or in combination of two or more thereof. A compounding amount of the antioxidant is preferably about 0.001 parts by mass or more, or about 0.01 parts by mass or more, based on 100 parts by mass of the thermoplastic resin/elastomer. In addition, the compounding amount of the antioxidant is preferably about 5 parts by mass or less, or about 1 part by mass or less based on 100 parts by mass of the thermoplastic resin/elastomer. When the amount of the antioxidant is smaller than about 0.001 parts by mass, there is a concern that the sufficient effects are hardly exhibited, whereas even when it is more than about 5 parts by mass, remarkable effects are not expected.

When used in layer B, the area density of the antioxidant is preferably about 0.1 g/m$^2$ or more, or about 0.2 g/m$^2$ or more, or about 0.5 g/m$^2$ or more. When the area density of the antioxidant in the layer B is less than about 0.1 g/m$^2$, the layer B is easily oxidized, and in the case where the laminated glass is used for a long period of time, the change in color difference is increased, and so on, and thus, the weather resistance tends to be decreased.

The area density of the antioxidant in the layer B is preferably about 2.5 g/m$^2$ or less, or about 2.0 g/m$^2$ or less, or about 1.5 g/m$^2$ or less. When the area density of the antioxidant in the layer A exceeds about 2.5 g/m$^2$, the color tone of the layer B tends to be impaired or the haze of the laminated glass tends to be decreased.

In addition, examples of the ultraviolet ray absorber include benzotriazole-based ultraviolet ray absorbers, such as 2-(5-methyl-2-hydroxyphenyl)benzotriazole, 2-[2-hydroxy-3,5-bis(α,α'-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole and 2-(3,5-di-t-amyl-2-hydroxyphenyl)benzotriazole, 2-(2'-hydroxy-5'-t-octylphenyl)triazole; hindered amine-based ultraviolet ray absorbers, such as 2,2,6,6-tetramethyl-4-piperidyl benzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate and 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine; benzoate-based ultraviolet ray absorbers, such as 2,4-di-t-butylphenyl-3,5-di-t-butyl-4-hydroxybenzoate and hexadecyl-3,5-di-t-butyl-4-hydroxybenzoate; and the like. An addition amount of such an ultraviolet ray absorber is preferably about 10 ppm or more, and or about 100 ppm or more on the basis of a mass relative to the thermoplastic resin/elastomer. In addition, the addition amount of the ultraviolet ray absorber is preferably about 50,000 ppm or less, or about 10,000 ppm or less on the basis of a mass relative to the thermoplastic resin/elastomer. When the addition amount of the ultraviolet ray absorber is smaller than about 10 ppm, there is a concern that the sufficient effects are hardly exhibited, whereas even when the addition amount of the ultraviolet ray absorber is more than about 50,000 ppm, remarkable effects are not expected. These ultraviolet ray absorbers can also be used in combination of two or more thereof.

In the case where a UV absorber is contained in the layer B, the area density (g/m$^2$) of the UV absorber in the layer B is preferably about 0.1 or more, or about 0.2 or more, or about 0.5 or more. When the area density (g/m$^2$) of the UV absorber in the layer B is about 0.1 or more, in the case where a laminated glass is formed, the haze tends to be improved, the weather resistance tends to be maintained, or the change in color difference tends to be suppressed.

In the case where a UV absorber is contained in the layer B, the area density (g/m$^2$) of the UV absorber in the layer B is preferably about 10 or less, or about 9 or less, or about 8 or less. When the area density (g/m$^2$) of the UV absorber in the layer B exceeds about 10, in the case where a laminated glass is formed, the visible light transmittance tends to be decreased, the haze tends to be deteriorated, the weather resistance tends to be decreased, or the change in color difference tends to be increased.

In some embodiments, it is also possible to use two or more types of UV absorbers in combination.

In other embodiments, no UV absorber is added, or the laminate is substantially UV absorber additive free.

Examples of the photostabilizer include hindered amine-based materials, such as "ADEKA STAB LA-57" (a trade name) manufactured by Adeka Corporation, and "TINUVIN 622" (a trade name) manufactured by Ciba Specialty Chemicals Inc.

In addition, it is also possible to control the adhesion of the resulting laminate to a glass or the like, if desired. As a method of controlling the adhesion, in general, there are exemplified a method of adding an adhesive to be used as an adhesion modifier of a laminated glass, a method of adding an additive of every sort for modifying the adhesion, and the like. By such a method, an intermediate film for laminated glass containing an adhesion modifier and/or an adhesive of every sort for modifying the adhesion is obtained.

As the adhesion modifier, for example, those disclosed in WO03/033583A1 can be used; alkali metal salts and alkaline earth metal salts are preferably used; and examples thereof include salts of potassium, sodium, magnesium, and the like. Examples of the salt include salts of organic acids, such as octanoic acid, hexanoic acid, butyric acid, acetic acid and formic acid; inorganic acids, such as hydrochloric acid and nitric acid; and the like.

Silanes such as disclosed in US2010/0108125A1 and US2011/0105681A1 may also be used as adhesion modifiers. In one embodiment, a silane coupling agent is used in layers A and C when ionomers are used as the thermoplastic resins. Exemplary silane coupling agents include, but are not limited to, γ-chloropropylmethoxysilane, vinyltrimethoxysilane, vinyltriethoxysilane, vinyltris(γ-methoxyethoxy)silane, γ-vinylbenzylpropyltrimethoxysilane, N-β-(N-vinylbenzylaminoethyl)-γ-aminopropyltrimethoxysilane, γ-methacryloxy-propyl-trimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane, and mixtures of two or more thereof.

The silane coupling agents are preferably incorporated in the ionomer composition at a level of about 0.01 wt %, or about 0.05 wt %, to about 5 wt %, or to about 1 wt %, based on the total weight of the ionomer composition.

Reactive functional group-containing olefinic polymers wherein the functional group is at least one group selected from a carboxyl group and a derivative group of a carboxyl group (herein below, referred to as carboxylic group) (herein below, referred to as a carboxylic group-containing olefinic polymer) can also be used as adhesion modifiers. In one embodiment, a reactive functional group-containing olefinic polymer is used in layer B.

Suitable carboxylic group-containing olefinic polymers are not specifically limited if it is an olefinic polymer containing a carboxylic group, but preferably it is a polymer of at leak one compound selected from an aliphatic unsaturated hydrocarbon compound having 2 to 12 carbon atoms and an aromatic unsaturated hydrocarbon compound having 8 to 12 carbon atoms, or a hydrogenated molecule thereof, wherein the carboxylic group is contained in the terminal or side chain of a molecular chain.

The carboxylic group-containing olefinic polymer used in the invention may be produced according to a conventionally known method and used. For example, it can be obtained by copolymerization of at least one compound selected from an aliphatic unsaturated hydrocarbon compound having 2 to 12 carbon atoms and an aromatic unsaturated hydrocarbon compound having 8 to 12 carbon atoms and a compound having a carboxylic group and a carbon-carbon double bond or a graft polymerization of a polyolefin, preferably a polyolefin having a carbon-carbon double bond, with a compound having a carboxylic group and a carbon-carbon double bond. Examples of the compound having a carboxylic group and a carbon-carbon double bond include unsaturated carboxylic acid and anhydride thereof like (meth)acrylic acid, crotonic acid, maleic acid, fumaric acid, itaconic acid, citraconic acid, tetrahydrophthalic acid, maleic anhydride, itaconic, anhydride, and tetrahydrophthalic anhydride; unsaturated carboxylic acid salt like lithium(meth)acrylate, sodium(meth)acrylate, potassium(meth)acrylate, magnesium(meth)acrylate, and sodium maleate, and; unsaturated carboxylic acid ester like methyl(meth)acrylate, ethyl(meth)acrylate, (meth)acrylate, n-propyl(meth)acrylate, i-propyl(meth)acrylate, n-butyl(meth)acrylate, i-butyl(meth)acrylate, t-butyl(meth)acrylate, 2-ethylhexyl(meth)acrylate, dodecyl(meth)acrylate, octadecyl(meth)acrylate, and dimethyl maleic acid, but not limited thereto.

A preferred example of a carboxylic group-containing olefinic polymer is one obtained by modifying (for example, grafting) a polyolefin such as an ethylene-based polymer or a propylene-based polymer using maleic acid anhydride, and particularly a maleic acid anhydride modified polypropylene. See, for example, U.S. Pat. No. 7,989,083B2.

When utilized, the amount of carboxylic group-containing olefinic polymer in layer B is such the amount of the carboxylic group in the layer B is preferably, although not specifically limited, from about 1 μeq/g, or from about 2 μeq/g, or from about 3 μeq/g, to about 1500 μeq/g, or to about 700 μeq/g, or to about 500 μeq/g in terms of atom. The amount of the carboxylic group indicates a value calculated in view of the carbonyl group included in the carboxylic group. When the amount of the carboxylic group is less than about 1 μeq/g, the improved adhesion between the layers may not be noticed. On the other hand, when the amount of the carboxylic group is more than about 1500 μeq/g, not only is the adhesion between the layers not improved significantly (versus lower amounts) but also the production cost of carboxylic group-containing olefinic polymer increases and the compatibility between the carboxylic group-containing olefinic polymer and the resin may be reduced.

Though an optimal addition amount of the adhesion modifier varies with the additive to be used, it is preferably adjusted in such a manner that an adhesive force of the resulting laminate to a glass is generally adjusted to about 3 or more and about 10 or less in a pummel test (described in WO03/033583A1 or the like). In particular, in the case where high penetration resistance is required, the addition amount of the adhesion modifier is more preferably adjusted in such a manner that the adhesive force is about 3 or more and about 6 or less, whereas in the case where high glass scattering preventing properties are required, the addition amount of the adhesion modifier is more preferably adjusted in such a manner that the adhesive force is about 7 or more and about 10 or less. In the case where high glass scattering preventing properties are required, it is also a useful method that the adhesive modifier is not added.

Suitable heat-shielding materials are described below.

Interlayer and Laminate

The laminate of the present invention is composed of an interlayer in which one or more layers B having the above-described properties is interposed between the at least two skin layers A and C having the above-described properties. By taking such a constitution, a laminate with excellent sound insulating properties, flexural strength, stiffness and optical properties, and desirably also solar heat-shielding properties, can be obtained from such interlayer.

A production method of the interlayer of the present invention is not particularly limited, and the interlayer may be produced by a method in which after uniformly kneading the resin composition constituting the layer B, the layer B is prepared by a known film formation method, such as an extrusion method, a calender method, a pressing method, a casting method and an inflation method, the layers A and C are prepared with the resin by the same method, and these layers may be laminated by means of press molding or the like, or the layer B, and the layers A and C, and other necessary layers, may be molded by a co-extrusion method.

Among the known film formation methods, in particular, a method of producing a interlayer using a co-extrusion machine is suitably adopted. A resin temperature at the time of extrusion is preferably about 150° C. or higher, or about 170° C. or higher. In addition, the resin temperature at the time of extrusion is preferably about 250° C. or lower, or about 230° C. or lower. When the resin temperature is too high, there is a concern that the used resin causes decomposition, thereby deteriorating the resin. Conversely, when the temperature is too low, discharge from the extrusion machine is not stabilized, resulting in causing a mechanical trouble. In order to efficiently remove a volatile material, it is preferred to remove the volatile material by measure of pressure reduction from a vent port of the extrusion machine.

In the interlayer of the present invention, a shear storage modulus at a temperature of 25° C. as measured by conducting a complex shear viscosity test under a condition at a frequency of 1 Hz in accordance with HS K 7244-10 is preferably about 1.30 MPa. or more, or about 2.00 MPa or more, or about 3.00 MPa or more. In the case where the shear storage modulus under the above-described conditions is about 1.30 MPa or more, on the occasion of using the interlayer for a laminated glass, the flexural strength is improved. On the other hand, from the viewpoints of making the appearance of the intermediate film for laminated glass more favorable and making the production of a laminated glass easy, in the interlayer, the shear storage modulus under the above-described conditions is preferably about 10.0 MPa or less, or about 8.00 MPa or less, or about 6.00 MPa or less.

The interlayer in which the shear storage modulus as measured under the above-described conditions is about 1.30 MPa or more can be, for example, obtained by laminating a layer B including a composition containing an elastomer having a peak at which a tan δ is maximum, in the range of from about −40° C. to about 30° C. and a plurality of layers A/C having a shear storage modulus at a temperature of 25° C. of about 10.0 MPa or more in such a manner that the layer B is interposed between the at least two layers A and C.

In the interlayer of the present invention, a shear storage modulus at a temperature of 50° C. as measured by conducting a complex shear viscosity test under a condition at a frequency of 1 Hz in accordance with HS K 7244-10 is preferably about 1.30 MPa or more, or about 1.50 MPa or more, or about 2.00 MPa or more. In the case where the above-described shear storage modulus is about 1.30 MPa or more, in particular, even when the temperature of the laminate increases to 50° C. or higher, the flexural strength is improved on the occasion of using the laminate for a laminated glass. On the other hand, from the viewpoints of making the appearance more favorable and making the production of a laminated glass easy, in the laminate, the shear storage modulus under the above-described condition is preferably about 6.00 MPa or less, or about 4.00 MPa or less, or about 3.00 MPa or less. The laminate having a shear storage modulus at a temperature of 50° C. as measured under the above-described condition of about 1.30 MPa or more can be obtained by laminating a layer A including a composition containing an elastomer having a peak at which a tan δ is maximum, in the range of from about −40° C. to about 30° C. and a plurality of layers B having a shear storage modulus at a temperature of 25° C. of about 10.0 MPa or more in such a manner that the layer A is interposed between the at least two layers B.

A film thickness of the layer B is preferably about 20 μm or more, or about 25 μm or more, or about 30 μm or more, or about 50 μm or more, or about 100 μm or more. In addition, the film thickness of the layer B is preferably about 500 μm or less, or about 400 μm or less, or about 300 μm or less. When the film thickness of the layer B is less than about 20 μm, the sound insulating properties tend to be lowered, whereas when the film thickness of the layer B is more than about 400 μm, there is a tendency that when a laminated glass is prepared, mechanical characteristics, such as penetration resistance, are deteriorated, so that a safety performance as a laminated glass is impaired. In the case where a plurality of the layers B is included in the laminate of the present invention, it is preferred that a total thickness of the entirety of the layer B satisfies the foregoing range.

A film thickness of the layer A or C is preferably about 20 μm or more, or about 150 μm or more, or about 200 μm or more. The film thickness of the layer A or C is preferably about 650 μm or less, or about 500 μm or less, or about 350 μm or less, or about 300 μm or less. When the film thickness of the layer A or C is less than about 100 μm, there is a tendency that the flexural rigidity of the laminate is small, so that the sound insulating properties in a high-frequency region are lowered, whereas when the film thickness of the layer A or C is more than about 650 μm, there is a tendency that the sound insulating properties are lowered regardless of the frequency region, or a time-dependent change of sound insulating performance is liable to be caused, so that the stability of sound insulating performance is lowered.

A total thickness of the combination of the layers A and C is preferably about 300 μm or more, or about 400 μm or more, or about 500 μm or more, or about 600 μm or more. The total thickness of the combination of the layers A and C is preferably about 750 μm or less, or about 720 μm or less, or about 700 μm or less. When the total thickness of the combination of the layers A and C is about 300 μm or more, the flexural strength of the laminate tends to become large, whereas when the total thickness of the combination of the layers A and C about 750 μm or less, the moldability is improved, so that the resulting laminate is liable to be wound up by a roll.

A ratio of the total thickness of the acoustic layer(s) (layer B for example) to the total thickness of the skin layers (A and C for example) ((total thickness of the layer B)/(total thickness of the layer A+C)) is preferably about 1/1 or less, or about 1/2 or less, or about 1/3 or less. The ratio of the total thickness of the layer B to the total thickness of the layers A+C is preferably about 1/30 or more, or about 1/15 or more, or about 1/6.5 or more, or about 1/5 or more. When the above-described ratio is smaller than about 1/30, the sound insulating effect of the laminate tends to become small. On the other hand, when the above-described ratio is more than about 1/1, there is a tendency that the flexural rigidity of the laminate becomes small, the sound insulating properties in a high-frequency region are lowered, a time-dependent change of sound insulating performance is liable to be caused, so that the stability of sound insulating performance is lowered, or the shear storage modulus of the laminate is lowered, so that the flexural strength of the laminate is lowered.

For example, in the case where the thermoplastic elastomer to be contained in the layer B is only one kind (or, even in the case where two or more kinds of thermoplastic elastomers are contained in the layer B, when thermoplastic elastomers in which a difference in the peak temperature of tan δ is less than about 5° C. are used), when the peak temperature of tan δ of the thermoplastic elastomer layer is about −20° C. or lower, a film thickness of the thermoplastic elastomer layer is preferably about 20 μm or more, or about 30 μm or more, and it is preferably about 120 μm or less, or about 100 μm or less. When the peak temperature of tan δ of the layer B containing the thermoplastic elastomer is higher than about −20° C. and about −15° C. or lower, the film thickness of the layer B containing the thermoplastic elastomer is preferably about 50 μm or more, or about 70 μm or more, and it is preferably about 200 μm or less, or about 160 μm or less. When the peak temperature of tan δ of the layer B containing the thermoplastic elastomer is higher than about −15° C., the film thickness of the layer B containing the thermoplastic elastomer is preferably about 80 μm or more, or about 100 μm or more, and it is preferably about 300 μm or less, or about 260 μm or less. When the film thickness of the layer B containing the thermoplastic elastomer falls outside the preferred range, there is a tendency that the sound insulating properties at room temperature are lowered, or the flexural strength of the resulting laminated glass is lowered.

Generally, the laminate of the present invention has a lamination constitution in which a layer B is interposed between layer A and layer C. Though the lamination constitution in the laminate is determined depending upon the purpose, it may be, in addition to the lamination constitution of (layer A)/(layer B)/(layer C), a lamination constitution of (layer A)/(layer B)/(layer C)/(layer B), (layer A)/(layer B)/(layer A)/(layer B)/(layer C), or (layer A)/(layer B1)/(layer B2)/(layer C). When the laminate is a two-layer constitution as in (layer A)/(layer B), the sound insulating properties or flexural strength of the intermediate film for laminated glass tends to be lowered.

One or more additional types of layers may also be included as a layer (referred to as "layer D") other than the layers A, B and C. For example, lamination constitutions, such as (layer A)/(layer B)/(layer D)/(layer C), (layer A)/(layer B)/(layer C)/(layer D), (layer A)/(layer D)/(layer B)/(layer D)/(layer C), (layer A)/(layer D)/(layer B)/(layer C)/(layer D), (layer A)/(layer B)/(layer D)/(layer C)/(layer D), (layer D)/(layer A)/(layer B)/(layer C)/(layer D), (layer D)/(layer A)/(layer B)/(layer D)/(layer C)/(layer D), (layer D)/(layer A)/(layer D)/(layer B)/(layer D)/(layer C)/(layer D), may be adopted. In addition, in the above-described lamination constitution, the components in the layer D may be identical with or different from each other. This is also applicable to the components in the layers A, B or C.

A total film thickness of the laminate is preferably about 320 μm or more, or about 420 μm or more. In addition, the total film thickness of the laminate is preferably about 1250 μm or less, or about 1,000 μm or less. When the film thickness of the laminate is too thin, there is a concern that in preparing a laminated glass, lamination cannot be achieved well. The film thickness of the laminate being too thick results in an increase of the costs, and hence, such is not preferred.

It is to be noted that a layer composed of a known resin is usable as the layer D. For example, polyethylene, polypropylene, polyvinyl chloride, polystyrene, polyvinyl acetate, polyurethane, polytetrafluoroethylene, an acrylic resin, a polyamide, a polyacetal, a polycarbonate, a polyester inclusive of polyethylene terephthalate and polybutylene terephthalate, a cyclic polyolefin, polyphenylene sulfide, polytetrafluoroethylene, a polysulfone, a polyether sulfone, a polyarylate, a liquid crystal polymer, a polyimide, a polyvinyl acetal (such as polyvinyl butyral) and the like can be used.

In addition, in the layer D, a plasticizer, an antioxidant, an ultraviolet ray absorber, a photostabilizer, an antiblocking agent, a pigment, a dye, a heat-shielding material (for example, an inorganic heat-shielding fine particle, an organic heat-shielding material each having infrared absorption ability) and/or an adhesion promoter, and the like may also be added, if desired.

For example, when a laminated glass is prepared by incorporating a heat-shielding fine particle or a heat-shielding compound as the heat-shielding material into the laminate of the present invention to give a heat-shielding function to the laminate, a transmittance at a wavelength of 1,500 nm can be regulated to about 50% or less. The heat-shielding fine particle may be contained in any of the layer A, B, C and/or D, if desired. The heat shielding fine particle may be contained in only one of the layers, or may be contained in the plural layers. In the case of incorporating the insulating fine particle, from the viewpoint of suppressing the optical unevenness, it is preferred that the insulating fine particle is contained in at least one layer B. Examples of the heat-shielding fine particle include a metal-doped indium oxide, such as tin-doped indium oxide (ITO), a metal-doped tin oxide, such as antimony-doped tin oxide (ATO), a metal-doped zinc oxide, such as aluminum-doped zinc oxide (AZO), a metal element composite tungsten oxide represented by a general formula: $M_mWO_n$ (M represents a metal element; in is about 0.01 or more and about 1.0 or less; and n is about 2.2 or more and about 3.0 or less), zinc antimonate ($ZnSb_2O_5$), lanthanum hexaboride, and the like. Of those, ITO, ATO, and a metal element composite tungsten oxide are preferred, and a metal element composite tungsten oxide is more preferred. Examples of the metal element represented by M in the metal element composite tungsten oxide include Cs, Tl, Rb, Na, K, and the like, and in particular, Cs is preferred. From the viewpoint of heat shielding properties, m is preferably about 0.2 or more, or about 0.3 or more, and it is preferably about 0.5 or less, or about 0.4 or less.

A content of the heat shielding fine particle is preferably about 0.01% by mass or more, or about 0.05% by mass or more, or about 0.1% by mass or more, or about 0.2% by mass or more relative to the whole of the resins used for the layers constituting the laminate. In addition, the content of the heat shielding fine particle is preferably about 5% by mass or less, or about 3% by mass or less. When the content of the heat shielding fine particle is more than about 5% by mass, there is a concern that the transmittance of visible rays is influenced. From the viewpoint of transparency of the laminate, an average particle diameter of the heat shielding fine particle is preferably about 100 nm or less, or about 50 nm or less. It is to be noted that the average particle diameter of the heat shielding particle as referred to herein means one measured by a laser diffraction instrument.

Examples of the heat shielding compound include phthalocyanine compounds, naphthalocyanine compounds, and the like. From the viewpoint of further improving the heat shielding properties, it is preferred that the heat shielding compound contains a metal. Examples of the metal include Na, K, Li, Cu, Zn, Fe, Co, Ni, Ru, Rh, Pd, Pt, Mn, Sn, V, Ca, Al, and the like, with Ni being especially preferred.

A content of the heat shielding compound is preferably about 0.001% by mass or more, or about 0.005% by mass or more, or about 0.01% by mass or more relative to the whole of the resins used for the layers constituting the laminate. In addition, the content of the heat shielding compound is preferably about 1% by mass or less, or about 0.5% by mass or less. When the content of the heat shielding compound is more than about 1% by mass, there is a concern that the transmittance of visible rays is influenced.

In addition, it is preferred that a concave and convex structure, such as a melt fracture and/or an embossing, is formed on the surface of the interlayer of the present invention by a conventionally known method. A shape of the melt fracture or embossing is not particularly limited, and those which are conventionally known can be adopted.

Preferably, at least one surface (and more preferably both surfaces) of the interlayer for a laminated glass is shaped. By shaping at least one surface of the interlayer for a laminated glass, in the case where a laminated glass is produced, an air bubble present at an interface between the interlayer for a laminated glass and a glass easily escapes to the outside of the laminated glass, and thus, the appearance of the laminated glass can be made favorable. It is preferred to shape at least one surface of the interlayer for a laminated glass by an embossing roll method, melt fracture, or the like. By shaping the surface of the interlayer for a laminated glass, a concave portion and/or a convex portion are/is formed on the surface of the interlayer for a laminated glass.

Examples of a method for shaping the surface of the interlayer for a laminated glass include a conventionally known embossing roll method, a profile extrusion method, and an extrusion lip embossing method utilizing melt fracture. Among these, an embossing roll method is preferred for stably obtaining the interlayer for a laminated glass having uniform and fine concave and convex portions formed thereon.

An embossing roll to be used in the embossing roll method can be produced by, for example, using an engraving mill (mother mill) having a desired concave-convex pattern and transferring the concave-convex pattern to the surface of a metal roll. Further, an embossing roll can also be produced using laser etching. Further, after forming a fine concave-convex pattern on the surface of a metal roll as described above, the surface with the fine concave-convex pattern is subjected to a blast treatment using an abrasive material such as aluminum oxide, silicon oxide, or glass beads, whereby a finer concave-convex pattern can also be formed.

Further, the embossing roll to be used in the embossing roll method is preferably subjected to a release treatment. In the case where an embossing roll which is not subjected to a release treatment is used, it becomes difficult to release the interlayer for a laminated glass from the embossing roll. Examples of a method for the release treatment include known methods such as a silicone treatment, a Teflon (registered trademark) treatment, and a plasma treatment.

The depth of the concave portion and/or the height of the convex portion (hereinafter sometimes referred to as "the height of the embossed portion") of the surface of the interlayer for a laminated glass shaped by an embossing roll method or the like are/is preferably about 5 µm or more, or about 10 µm or more, or about 20 µm or more. When the height of the embossed portion is about 5 µm or more, in the case where a laminated glass is produced, an air bubble present at an interface between the interlayer for a laminated glass and a glass is less likely to remain, and thus, the appearance of the laminated glass tends to be improved.

The height of the embossed portion is preferably about 150 µm or less, or about 100 µm or less, or about 80 µm or less. When the height of the embossed portion is about 150 µm or less, in the case where a laminated glass is produced, the adhesiveness between the interlayer for a laminated glass and a glass becomes favorable, and thus, the appearance of the laminated glass tends to be improved.

In the invention, the height of the embossed portion refers to a maximum height roughness (Rz) defined in JIS B 0601 (2001). The height of the embossed portion can be measured by, for example, utilizing the confocal principle of a laser microscope or the like. Incidentally, the height of the embossed portion, that is, the depth of the concave portion or the height of the convex portion may vary within a range that does not depart from the gist of the invention.

Examples of the form of the shape imparted by an embossing roll method or the like include a lattice, an oblique lattice, an oblique ellipse, an ellipse, an oblique groove, and a groove. Among these, the form is preferably an oblique lattice, an oblique groove, or the like from the viewpoint that an air bubble more favorably escapes. The inclination angle is preferably from 10° to 80° with respect to the film flow direction (MD direction).

The shaping by an embossing roll method or the like may be performed on one surface of the interlayer for a laminated glass, or may be performed on both surfaces, but is more preferably performed on bath surfaces. Further, the shaping pattern may be a regular pattern or an irregular pattern such as a random matte pattern, or a pattern such as disclosed in U.S. Pat. No. 7,351,468B2.

Laminated Glass

When the constitution of the laminate of the present invention is included in the inside of a glass, it is possible to obtain a laminated glass with excellent flexural strength, a laminated glass with excellent sound insulating properties, particularly sound insulating properties in a high-frequency region, a laminated glass with excellent sound insulating properties and stability of sound insulating performance, and a laminated glass with excellent sound insulating properties over a broad temperature range.

For that reason, the laminated glass of the present invention can be suitably for a windshield for automobile, a side glass for automobile, a sunroof for automobile, a rear glass for automobile, or a glass for head-up display; a building member for a window, a wall, a roof, a sunroof, a sound insulating wall, a display window, a balcony, a handrail wall, or the like; a partition glass member of a conference room; and the like. In the case where the laminated glass including the constitution of the laminate of the present invention in the inside thereof is applied to a glass for head-up display, a cross-sectional shape of the laminate to be used is preferably a shape in which an end surface side of one side is thick, whereas an end surface side of the other side is thin. In that case, the cross-sectional shape may be a shape in which the whole is a wedge shape in such a manner that it becomes gradually thin from the end surface side of one side toward the end surface side of the other side, or may be a shape in which a part of the cross section is a wedge shape such that the thickness is identical until an arbitrary position between the end surface of one side and the end surface of the other side, and it becomes gradually thin from the foregoing arbitrary position toward the end surface of the other side.

In general, two sheets of glass are used for the laminated glass of the present invention. Though a thickness of the glass constituting the laminated glass of the present invention is not particularly limited, it is preferably about 100 mm or less. In addition, since the laminate of the present invention is excellent in flexural strength and stiffness, even when a laminated glass is prepared by using a thin sheet glass having a thickness of about 2.8 mm or less, weight reduction of the laminated glass can be realized without impairing the strength or flexibility of the laminated glass. From the viewpoint of weight reduction, with respect to the thickness of the glass, a thickness of at least one sheet of glass is preferably about 2.8 mm or less, or about 2.5 mm or less, or about 2.0 mm or less, or about 1.8 mm or less. In particular, by regulating a thickness of the glass of one side to about 1.8 mm or more, regulating a thickness of the glass of the other side to about 1.8 mm or less, and regulating a difference in thickness between the respective glasses to about 0.2 mm or more, a laminated glass in which thinning and weight reduction have been realized without impairing the flexural strength can be prepared. The difference in thickness between the respective glasses is preferably about 0.5 mm or more.

In terms of light weighting, in one embodiment a laminated glass in accordance with the invention has a mass (areal density) of about 10 kg/m2 or less, or about 9.5 kg/m2 or less. In another embodiment a laminated glass in accordance with the invention has a mass in the range of from about 7 kg/m2, or from about 7.5 kg/m2, or from about 8 kg/m2, to about 10 kg/m2, or to about 9.5 kg/m2, or to about 9 kg/m2.

Sound Insulating Properties Generally

The sound insulating properties of laminated glass may be measured directly using a sound transmission loss (STL) method such as that specified in ASTM E90-09. In this method, two adjacent reverberation rooms are arranged with an opening between them in which the test sample is installed. An approximately diffuse sound field is produced in one room, the source room. Sound incident on the test partition causes it to vibrate and create a sound field in the second room, the receiving room. The space- and time-averaged sound pressure levels in the two rooms are determined. In addition, with the test specimen in place, the sound absorption in the receiving room is determined. The sound pressure levels in the two rooms, the sound absorption in the receiving room and the area of the specimen are used to calculate sound transmission loss. This is a measure of the sound pressure change resulting from the sound barrier properties of the sample. Because transmission loss is a function of frequency, measurements are made in a series of frequency bands.

Sound transmission loss behavior over a range of test frequencies can be complex. In order to expedite comparisons between different laminated glass structures, the acoustic barrier performance may be simply represented by a single number classification rating called the sound transmission class (STC). The STC classification is determined by fitting a standard reference curve to the STL measurements by following the procedure specified in ASTM E413-10. Higher values of STC represent superior acoustic barrier performance.

Preferably the STC is about 32 or greater, or about 33 or greater, when measured as follows.

STL was measured at ⅓ octave bands over a frequency range of 50 Hz to 10,000 Hz. A sample size of 495 mm×495 mm was employed and all measurements were performed at 20° C., in accordance with ASTM E90-09. The STC was determined from STL measurements by following the analysis procedure specified in ASTM E413-10.

The laminate loss factor and the equivalent bending rigidity modulus of a laminated glass are related to the STL of the laminated glass. The loss factor and the equivalent bending rigidity modulus can be determined from the measurement of the input impedance of a glass beam sample following ISO16940:2008(E). The input impedance is the transfer function between the injected force in one point and the velocity. This transfer function has resonances corresponding to a maximum of the response of the system (resonance frequency for a given vibration mode).

In one embodiment, the laminate loss factor at the third vibration mode, when measured in accordance with ISO16940:2008(E), is at least about 0.4, or at least about 0.41, or at least about 0.42, or at least about 0.44, or at least about 0.45.

In another embodiment, the equivalent bending rigidity modulus at the third vibration mode, when measured in accordance with ISO16940:2008(E), is at least about 70 N·m, or at least about 100 N·m, or at least about 130 N·m, or at least about 160 N·m.

Maximum Loss Factor

The sound insulating properties of the laminated glass can also be evaluated in terms of a loss factor obtained by a damping test by a central exciting method. The damping test is a test for evaluating what value does the loss factor take by the frequency or temperature. When the frequency is fixed, a loss factor that becomes maximum in a certain temperature range is called a maximum loss factor. In accordance with the damping measurement by a central exciting method, a value of loss factor relative to a frequency at a fixed temperature is obtained. In order to obtain a maximum loss factor, the measurement is carried out by varying the temperature to 0, 10, 20, 30, 40, and 50° C., respectively, and a linear form of the loss factor relative to the temperature at a fixed frequency can be obtained from the obtained value. The maximum loss factor is an index expressing a virtue of damping, and specifically, it is an index expressing how fast the flexural vibration generated in a platy material decays. Namely, the maximum loss factor is an index of sound insulating properties, and it may be said that the higher the maximum loss factor of a laminated glass, the higher the sound insulating properties of the laminated glass are.

In another embodiment, in the case where a laminated glass is prepared by using the laminate as an intermediate film for laminated glass, and the resulting laminated glass is subjected to a damping test by a central exciting method, the maximum loss factor at a frequency of 2,000 Hz and at a temperature of 0 to 50° C. is preferably about 0.20 or more, or about 0.25 or more, or about 0.28 or more. In the case where the maximum loss factor under the above-described conditions is less than about 0.20, the sound insulating properties of the laminated glass are poor, so that the resulting laminated glass is not suited for an application aiming at the sound insulation. The laminated glass in which the maximum loss factor as measured under the above-described conditions is about 0.20 or more can be obtained by laminating a layer B including a composition containing an elastomer having a peak at which a tan δ is maximum, in the range of from about −40° C. to about 30° C. and a plurality of layers (layers A and C) having a shear storage modulus at a temperature of 25° C. as measured by conducting a complex shear viscosity test of about 10.0 MPa or more in such a manner that the layer B is interposed between the at least two layers A and C.

Sound Insulating Properties in a High-Frequency Region

Here, from the viewpoint that a laminated glass capable of suppressing a lowering of the sound insulating performance in a high-frequency region to be caused due to a coincidence phenomenon, when the laminate of the present invention is interposed between two sheets of float glass having a length of 300 mm, a width of 25 mm, and a thickness of 1.9 mm to prepare a laminated glass, a loss factor at a quaternary resonance frequency as measured at 20° C. by a central exciting method is preferably about 0.2 or more, or about 0.4 or more, or about 0.6 or more. When the loss factor at a quaternary resonance frequency is less than about 0.2, the sound insulating properties tend to become not sufficient. In order to regulate the loss factor at a quaternary resonance frequency to about 0.2 or more, for example, it is possible to achieve such by a method of using a material in which a content of the hard segment is a prescribed proportion or more (for example, about 14% by mass or more) relative to the thermoplastic elastomer constituting the layer B and regulating a ratio of the total thickness of the layer B to the total thickness of the layers A+C serving as a protective layer of the laminate to a prescribed portion or more (for example, about 1/6.5 or more), or other method.

The loss factor at a quaternary resonance frequency can be, for example, measured by the following method. The laminate is interposed between two sheets of commercially available float glass (300 mm in length×25 mm in width×1.9 mm in thickness), and a laminated glass is prepared by a vacuum bagging method (condition: the temperature is increased from 30° C. to 160° C. for 60 minutes, followed by holding at 160° C. for 30 minutes). Thereafter, the center of the laminated glass is fixed to a tip portion of an exciting force detector built in an impedance head of an exciter of a mechanical impedance instrument, a vibration is given to the center of the laminated glass at a frequency in the range of from 0 to 10,000 Hz, and an exciting force and an acceleration waveform at this point are detected, thereby conducting a damping test of the laminated glass by a central exciting method. A mechanical impedance at an exciting point (the center of the laminated glass to which a vibration is given) is determined on the basis of the obtained exciting force and a speed signal obtained by integrating an acceleration single; and in an impedance curve obtained by setting the frequency on the abscissa and the mechanical impedance on the ordinate, respectively, the loss factor of the laminated glass at a quaternary resonance frequency can be determined from a frequency expressing a peak of the quaternary mode and a half-width value.

In addition, from the viewpoint of preparing a laminated glass capable of suppressing a lowering of the sound insulating performance in a high-frequency region to be caused due to a coincidence phenomenon, when the laminate of the present invention is interposed between two sheets of float glass having a length of 300 mm, a width of 25 mm, and a thickness of 1.9 mm to prepare a laminated glass, a flexural rigidity at the quaternary resonance frequency as calculated in accordance with ISO 16940 (2008) is preferably about 150 N·m or more, or about 200 N·m or more. When the flexural rigidity at a quaternary resonance frequency is less than about 150 N·m, the coincidence phenomenon is liable to be generated, so that the sound insulating properties in a high-frequency region tends to be lowered. In order to regulate the flexural rigidity at a quaternary resonance frequency to about 150 N·m or more, for example, it is possible to achieve such by a method of using a material in which a content of the hard segment is a prescribed proportion or more (for example, about 14% by mass or more) relative to the thermoplastic elastomer constituting the layer B and regulating a ratio of the total thickness of the layer B to the total thickness of the layers A+C serving as a protective layer of the laminate to a prescribed portion or more (for example, about 1/1 or less), or other method.

In addition, an acoustic transmission loss at 6,300 Hz as calculated in accordance with ISO 16940 (2008) by using the loss factor and flexural rigidity at a quaternary resonance frequency is preferably about 43 dB or more, or about 45 dB or more. An acoustic transmission loss at 8,000 Hz is preferably about 50 dB or more, or about 53 dB or more. An acoustic transmission loss at 10,000 Hz is preferably about 56 dB or more, or 60 about dB or more.

Stability of Sound Insulating Performance

Here, from the viewpoint of preparing a laminated glass in which a time-dependent change of sound insulating performance after preparation of the laminated glass is small and which is excellent in stability of sound insulating performance, the laminate of the present invention is preferably a laminate having the layer B located between the skin layers A and C and satisfying such that with respect to a laminated glass prepared by interposing the laminate of the present invention between glasses having a thickness 2 mm and holding for contact bonding under conditions at a temperature of 140° C. and at a pressure of 1 MPa for 60 minutes, a loss factor α at 20° C. and at 2,000 Hz as measured by a damping test by a central exciting method is about 0.2 or more, and with respect to the laminated glass after holding at 18° C. for one month, a ratio β/α of a loss factor β at 20° C. and at 2,000 Hz as measured by a damping test by a central exciting method to the loss factor α is about 0.70 or more; or a laminate having the layer B located between the skin layers A and C and satisfying such that with respect to a laminated glass containing the laminate after holding the laminated glass at 18° C. for one month, a loss factor β at 20° C. and at 2,000 Hz as measured by a damping test by a central exciting method is about 0.2 or more, and with respect to a laminated glass after heating the laminated glass having been held at 18° C. for one month at 100° C. for 24 hours, a ratio γ/β of a loss factor γ at 20° C. and at 2,000 Hz as measured by a damping test by a central exciting method to the loss factor β is about 0.80 or more and about 1.30 or less.

As a method of obtaining a laminate capable of satisfying the prescribed requirements for the laminated glass regarding the loss factors α, and γ as measured by a damping test by a central exciting method as described later, for example, there are exemplified the following methods of constituting the laminate.

A first constitution is a constitution in which the layer B is a layer containing a block copolymer having at least one aromatic vinyl polymer block and at least one aliphatic unsaturated hydrocarbon polymer block, or a hydrogenated product of the copolymer; the layer A is a layer containing an ionomer resin, and the layer C is a layer containing an ionomer resin or a polyvinyl acetal resin and not containing a plasticizer or containing a plasticizer (particularly for the polyvinyl acetal resin), and in the case of containing a plasticizer, a content of the plasticizer is more than 0 and about 30 parts by mass or less (preferably about 25 parts by mass or less, or about 20 parts by mass or less, or about 15 parts by mass or less, or about 10 parts by mass or less) based on 100 parts by mass of the resin; and a ratio of a total thickness of the layer B to a total thickness of the layers A+C ((total thickness of the layer B)/(total thickness of the layers A+C)) is in the range of from about 1/30 to about 1/3.

In addition, a second constitution is a laminate having the layer B located between the skin layers A and C and having a constitution in which the layer B is a layer containing a block copolymer having at least one aromatic vinyl polymer block and at least one aliphatic unsaturated hydrocarbon polymer block, or a hydrogenated product of the copolymer; the layer A is a layer containing an ionomer resin, and the layer C is a layer containing an ionomer resin or a polyvinyl acetal resin and not containing a plasticizer or containing a plasticizer, and in the case of containing a plasticizer (particularly for the polyvinyl acetal resin), a content of the plasticizer is more than 0 and about 25 parts by mass or less (or about 20 parts by mass or less, or about 15 parts by mass or less, or about 10 parts by mass or less, or about 3 parts by mass or less) based on 100 parts by mass of the resin. In this case, a ratio of a total thickness of the layer B to a total thickness of the skin layers A+C is preferably in the range of from about 1/30 to about 1/1. In addition, as the block copolymer, it is preferred to use the block copolymer as explained in the section of the layer B.

It is to be noted that on the occasion of adopting these constitutions, it is preferred to use, as the ionomer resin or polyvinyl acetal resin, the ionomer resin or polyvinyl acetal resin as explained in the section of the skin layers A and C. These constitutions merely exemplify the constitution of the laminate of the present invention, and the laminate of the present invention is not limited to these constitutions. In addition, the plasticizer which may be contained in the layers A or C to be used for these constitutions is an ester-based plasticizer or an ether-based plasticizer each having a melting point of about 30° C. or lower or being amorphous and also having a hydroxyl value of about 15 to about 450 mgKOH/g or less.

In the laminated glass obtained from the laminate of the present invention, which is prepared by interposing the laminate between two sheets of glass having a thickness 2 mm and contact bonding under conditions at a temperature of 140° C. and at a pressure of 1 MPa for 60 minutes, the laminated glass after preparation (for example, immediately after preparation) has a loss factor α at 20° C. and at 2,000 Hz as measured by a damping test by a central exciting method of about 0.2 or more, or about 0.25 or more, or about 0.30 or more. When the loss factor α under the above-described conditions is about 0.2 or more, the laminated glass has thoroughly high sound insulating properties. It is to be noted that the terms "immediately after preparation of the laminated glass" mean a time within 2 hours after the laminated glass is prepared and finished with cooling to room temperature.

In addition, with respect to the laminated glass after holding the prepared laminated glass at 18° C. for one month, a ratio β/α of a loss factor β at 20° C. and at 2,000 Hz as measured by a damping test by a central exciting method to the loss factor α is preferably about 0.70 or more, or about 0.80 or more, or about 0.87 or more. In addition, β/α is preferably about 1.20 or less, or about 1.10 or less. When β/α is about 0.70 or more, the stability of sound insulating performance is improved. On the other hand, when β/α is about 1.20 or less, the holding time can be shortened.

In addition, with respect to a laminated glass after heating the laminated glass having been held at 18° C. for one month at 100° C. for 24 hours, a ratio γ/β of a loss factor γ at 20° C. and at 2,000 Hz as measured by a damping test by a central exciting method to the loss factor β is preferably about 0.80 or more, or about 0.87 or more, or about 0.90 or more. In addition, γ/β is about 1.30 or less, or about 1.20 or less, or about 1.10 or less. When γ/β is about 0.80 or more, or about 1.30 or less, the stability of sound insulating performance can be improved, and the holding time can be shortened.

Sound Insulating Properties Over a Broad Temperature Range

Here, from the viewpoint of obtaining a laminated glass with excellent sound insulating properties over a broad temperature range, a maximum loss factor in a tertiary mode as measured by a central exciting method is preferably about 0.2 or more, or about 0.23 or more, or about 0.25 or more. When the loss factor in a tertiary mode is less than about 0.2, the sound insulating properties tend to be not sufficient. In order to regulate the loss factor in a tertiary mode to about 0.2 or more, for example, it is possible to achieve such by a method of using, as an internal layer (layer B) serving as a sound insulating layer, a layer having a peak at which a tan δ as measured by conducting a complex shear viscosity test under a condition at a frequency of 1 Hz in accordance with JIS K 7244-10 is maximum, in the range of about −40° C. or higher and about 30° C. or lower (the peak will be sometimes abbreviated as "peak temperature of tan δ") or, as the thermoplastic elastomer constituting the layer B, an elastomer in which a content of the hard segment is a prescribed portion or less (for example, about 50% by mass or less), and regulating a thickness of the internal layer (layer B) serving as a sound insulating layer to about 20 μm or more, or other method. In addition, a loss factor at 20° C. is preferably about 0.2 or more, or about 0.25 or more. When the loss factor at 20° C. is less than about 0.2, the sound insulating properties at room temperature tend to be not sufficient. In order to regulate the loss factor at 20° C. to about 0.2 or more, for example, there is exemplified a method of allowing a balance between the peak temperature of tan δ of the layer B and the thickness of the layer B to fall within an appropriate range.

The loss factor in a tertiary mode can be, for example, measured by the following method. The laminate is interposed between two sheets of commercially available float glass (50 mm in width×300 mm in length×3 mm in thickness), and a laminated glass is prepared by a vacuum bagging method (condition: the temperature is increased from 30° C. to 160° C. for 60 minutes, followed by holding at 160° C. for 30 minutes). Thereafter, the center of the laminated glass is fixed to a tip portion of an exciting force detector built in an impedance head of an exciter of a mechanical impedance instrument, a vibration is given to the center of the laminated glass at a frequency in the range of from 0 to 8,000 Hz, and an exciting force and an acceleration waveform at this point are detected, thereby conducting a damping test of the laminated glass by a central exciting method. A mechanical impedance at an exciting point (the center of the laminated glass to which a vibration is given) is determined on the basis of the obtained exciting force and a speed signal obtained by integrating an acceleration single; and the loss factor of the laminated glass can be determined from a frequency expressing a peak of the tertiary mode and a half-width value.

A width of the temperature range where the loss factor is 0.2 or more can be determined from the loss factor determined by the above-described method. The width of the temperature range where the loss factor is 0.2 or more is preferably about 15° C. or more, or about 20° C. or more, or about 23° C. or more, or about 25° C. or more. When the width of the temperature range where loss factor is 0.2 or more is less than about 15° C., the sound insulating properties over a broad temperature range cannot be revealed, so that the sound insulating properties of the laminated glass in a low-temperature region and/or a high-temperature region tend to be lowered.

Examples of a method of widening the width of the temperature range where the loss factor is 0.2 or more include a method of optimizing the thickness of the internal layer (layer B) according to the kind of the thermoplastic elastomer; a method of using a mixture of two or more thermoplastic elastomers having a different peak temperature of tan δ from each other as the internal layer (layer B); a method in which the internal layer (layer B) is composed of two or more layers, and a thermoplastic elastomer having a peak temperature of tan δ different from a peak temperature of tan δ of a thermoplastic elastomer used for the at least one layer is used for the layer different from the foregoing layer; a method in which as two or more thermoplastic elastomers having a different peak temperature of tan δ from each other, those having a large difference in the peak temperature of tan δ are used; and the like. In general, even in the case of using a mixture of two kinds of elastomers, those two elastomers are compatibilized with each other to exhibit one peak; however, in the case where two peaks are observed, any one of the peak temperatures of tan δ may be included in the range prescribed in the present invention.

Heat-Shielding Properties

In the case where the laminated glass of the present invention includes a heat-shielding material, a transmittance at a wavelength of 1,500 nm is preferably about about 50% or less, or about 20% or less. When the transmittance at a wavelength of 1,500 nm is about 50% or less, there is a tendency that a shield factor of infrared rays is high, so that heat shielding performance of the laminated glass is improved.

Haze

Haze is the percentage of luminous flux that is scattered at a specified angle.

In one embodiment, in the laminated glass of the present invention, when the multilayer interlayer is laminated between two panes of glass of a thickness of 1.6 mm each to produce a laminate, a haze thereof as measured in accordance with ASTM D1003-61 (method A) at an angle of more than 2.5 degrees from the axis defined by the path of unscattered light traveling through the laminate (using a Hazegard-i hazemeter, available from BYK-Gardner USA of Columbia, Md., USA), is preferably about 0.6% or less, or about 0.55% or less, or about 0.5% or less, or about 0.45% or less.

In another embodiment of the laminated glass of the present invention, when the interlayer having a thickness of 0.75 mm is laminated between two sheets of float glass having a thickness of 2 mm, a haze thereof as measured in accordance with HS K 7136 is preferably less than about 5, or less than about 3, or less than about 2, or less than about 1, or less than about 0.5. When the haze is about 5 or more, the transparency of the laminated glass tends to be lowered.

Breaking Strength

In a laminated glass obtained by interposing the laminate of the present invention between two sheets of float glass of 26 mm in length×76 mm in width×2.8 mm in thickness, a breaking strength thereof in a three-point bending test (temperature: 20° C., inter-fulcrum distance: 55 mm, test speed: 0.25 mm/min) is preferably about 0.3 kN or more, or about 0.5 kN or more, or about 0.6 kN or more. When the breaking strength as measured under the above-described conditions is less than about 0.3 kN, the strength of the laminated glass tends to be lowered.

Laminate Effective Thickness in Bending

The stiffness behavior of laminated glass may be characterized by the laminate effective thickness, $t_{\mathit{eff}}$ (Reference Shitanoki et. al., ASTM E1300-09). The effective thickness is determined from analysis of the four point bending behavior of the laminate following ISO1288-4:2016. Note that larger values of laminate effective thickness represent higher laminate stiffness behavior.

The laminate effective thickness, $t_{\mathit{eff}}$, in bending is determined from the following procedure:

1. Measure the load (P)-deflection (δ) behavior using the four point bend test—ISO1288-4:2016 with modified sample size 500 mm×360 mm, supported on a 300 mm span ($L_1$) and loaded with a 150 mm span ($L_2$).

2. Calculate the laminate effective thickness, $t_{\mathit{eff}}$ using eq. 1

$$t_{\mathit{eff}}=[PL_3(3L_1^2-4L_3^2)/(4\delta Eb)]^{1/3} \quad (1)$$

where E is the glass Young's modulus (=71.6 GPa), b is the sample width (=360 mm) and $L_3=(L_1-L_2)/2$ (=150 mm).

Note that a loading rate of 0.1 mm/sec is employed and all measurements are carried out at 20° C.

When measured in accordance with ISO1288-4:2016, but using a laminated glass obtained by interposing the laminate of the present invention between two sheets of float glass of 500 mm in length×360 mm in width×4.0 mm in thickness, an effective thickness thereof in a four-point bending test (temperature: 20° C., support span=300 mm and loading span=150 mm, test speed: 0.1 mm/second) is preferably about 2.8 mm or more, or about 3.0 mm or more, or about 3.4 mm or more.

Birefringence

It is preferred that the interlayer when sandwiched between two glasses has a birefringence phase difference of about 0 to about 140 nm.

Production Method of Laminated Glass

It is possible to produce the laminated glass of the present invention by a conventionally known method. Examples thereof include a method of using a vacuum laminator, a method of using a vacuum bag, a method of using a vacuum ring, a method of using a nip roll, and the like. In addition, a method can be used in which, after temporary contact bonding, the resultant laminate is put into an autoclave for final bonding.

In the case of using a vacuum laminator, for example, a known instrument which is used for production of a solar cell is used, and the assembly is laminated under a reduced pressure of about $1 \times 10^{-6}$ MPa or more and about $3 \times 10^{-2}$ MPa or less at a temperature of about 100° C. or higher, or about 130° C. or higher, and about 200° C. or lower, or 170° C. or lower. The method of using a vacuum bag or a vacuum ring is, for example, described in the specification of EP1235683A1 (CA23881.07A1), and for example, the assembly is laminated under a pressure of about $2 \times 10^{-2}$ MPa at about 130° C. or higher and about 115° C. or lower.

With respect to the preparation method of a laminated glass, in the case of using a nip roll, for example, there is exemplified a method in which after conducting first temporary contact bonding at a temperature of a flow starting temperature of the skin resin or lower, temporary contact bonding is further conducted under a condition close to the flow starting temperature. Specifically, for example, there is exemplified a method in which the assembly is heated at about 30° C. or higher and about 100° C. or lower by an infrared heater or the like, then deaerated by a roll, and further heated at about 50° C. or higher and about 150° C. or lower, followed by conducting contact bonding by a roll to achieve bonding or temporary bonding.

In addition, a laminated glass may also be prepared by gathering and laminating glasses in which the layer B is coated on the both surfaces of the layer A such that the constitution of the laminate of the present invention is included in the inside of the laminated glass.

Though the autoclave process which is supplementarily conducted after the temporary contact bonding is variable depending upon the thickness or constitution of a module, it is, for example, carried out under a pressure of about 1 MPa or more and about 15 MPa or less at a temperature of about 120° C. or higher and about 160° C. or lower for about 0.5 hours or more and about 2 hours or less.

The glass to be used on the occasion of preparing a laminated glass is not particularly limited. Inorganic glasses, such as a float sheet glass, a polished sheet glass, a figured glass, a wired sheet glass, a heat-ray absorbing glass, and besides, conventionally known organic glasses, such as polymethyl methacrylate and polycarbonate, and the like can be used. These glasses may be any of colorless, colored, transparent, or non-transparent glasses. These glasses may be used solely, or may be used in combination of two or more thereof.

Specific Embodiments

The following is an exemplification of specific embodiments of the present invention based on the description above. These specific embodiments are just exemplary, and many additional specific embodiments will be evident to those of ordinary skill in the relevant art from the above description optionally in combination with additional information generally known to those of ordinary skill in the relevant art.

An interlayer in which a ratio of a sum total of the thickness of the layers B to a sum total of the thickness of the layers A and C ((sum total of the thickness of the layers B)/(sum total of the thickness of the layers A+C)) is in the range of from about 1/30 to about 1/1.

A laminate in which the transmittance at a wavelength of 1,500 nm is about 50% or less.

An interlayer in which a heat-shielding material is contained in at least one layer of either the layers B or the layers A and/or C.

An interlayer in which the heat-shielding material is at least one material selected from tin-doped indium oxide, antimony-doped tin oxide, zinc antimonate, metal-doped tungsten oxide, a phthalocyanine compound, aluminum-doped zinc oxide and lanthanum hexaboride.

An interlayer in which metal-doped tungsten oxide is cesium-doped tungsten oxide.

An interlayer in which the heat shielding material is contained in both of layer A and layer C.

An interlayer in which the heat shielding material is a cesium-doped tungsten oxide (CWO), is contained in both layer A and layer C, and is contained in an amount of from about 0.17 g/m2 to about 0.35 g/m2.

An interlayer in which the heat shielding material is a tin-doped indium oxide (ITO), is contained in both layer A and layer C, and is contained in an amount of from about 0.3 g/m2 to about 0.6 g/m2.

An interlayer in which the heat shielding material is a mixture of CWO and ITO, is contained in both layer A and layer C, and is contained in an amount of from about 0.05 g/m2 to about 0.15 g/m2 CWO, and from about 0.4 g/m2 to about 0.5 g/m2 ITO.

An interlayer in which a UV absorber is contained in at least one or both layer A and layer C, or in all of Layer A, Layer B and Layer C.

An interlayer in which a UV absorber is contained in both layer A and layer C in an amount of from about 0.2 wt % to about 1 wt %, based on total weight of the layer.

An interlayer in which a UV absorber is contained in layer B in an amount of from about 0.25 wt % to about 0.5 wt %, based on total weight of the layer.

An interlayer in which a UV absorber is contained in both layer A and layer C in an amount of from about 0.2 wt % to about 1 wt %, based on total weight of the layer, and in layer B in an amount of from about 0.25 wt % to about 0.5 wt %, based on total weight of the layer.

An interlayer which contains at least one UV absorber selected from the group consisting of a benzotriazole-based compound, a benzophenone-based compound, a triazine-based compound, a benzoate-based compound, a malonic ester-based compound, and an oxalic anilide-based compound.

An interlayer containing a UV absorber in which the UV absorber is a chlorinated benzotriazole.

An interlayer in which a light stabilizer is contained in at least one or both layer A and layer C, or in all of Layer A, Layer B and Layer C.

An interlayer in which a light stabilizer is contained in both layer A and layer C in an amount up to about 0.8 wt %, based on total weight of the layer.

An interlayer in which a light stabilizer is contained in layer an amount up to about 0.4 wt %, based on total weight of the layer.

An interlayer in which a light stabilizer is contained in both layer A and layer C in an amount up to about 0.8 wt %, based on total weight of the layer, and in layer B in an amount up to about 0.4 wt % based on total weight of the layer.

An interlayer in which an antioxidant is contained in at least one or both layer A and layer C, or in all of Layer A, Layer B and Layer C.

An interlayer in which an antioxidant is contained in both layer A and layer C in an amount up to about 0.2 wt %, based on total weight of the layer.

An interlayer in which an antioxidant is contained in layer B in an amount up to about 0.1 wt %, based on total weight of the layer.

An interlayer in which an antioxidant is contained in both layer A and layer C in an amount up to about 0.2 wt %, based on total weight of the layer, and in layer B in an amount up to about 0.1 wt %, based on total weight of the layer.

An interlayer containing an antioxidant which is a combination phenol/phosphite.

A laminated glass which is a windshield for automobile, a side glass for automobile, a sunroof for automobile, a rear glass for automobile, or a glass for a heads-up display.

A laminated glass in which each glass sheet constituting the laminated glass is a thin sheet glass having a thickness of about 2.8 mm or less.

A laminated glass in which a thickness of the glass sheet of one side is about 1.8 mm or more, a thickness of the glass sheet of the other side is about 1.8 mm or less, and a difference in thickness between the respective glass sheets is about 0.2 mm or more.

A multilayer interlayer which when laminated between two panes of glass of a thickness of 1.6 mm each to produce a laminate, the resulting laminate possesses a combination of a sound transmission class (STC) of about 33 or greater (as in accordance with ASTM E90-9 and ASTM E413-10 as described above), laminate loss factor of at least about 0.4 (as determined in accordance with ISO16940:2008(E) as described above), an equivalent bending rigidity modulus of at least about 70 N·m, or at least about 100 N·m, or at least about 130 N·m (as determined in accordance with ISO16940:2008(E) as described above), an effective thickness of at least about 2.8 mm (as determined in accordance with ISO1288-4:2016 (modified as described above, see equation-1), and a laminate haze of less than about 0.6 (as determined in accordance with ASTM D1003-61 (method A) as described above).

A glass laminate comprising a first sheet of glass and a second sheet of glass having interposed therebetween a thermoplastic multilayer interlayer, wherein the laminate has a mass in the range from about 7 kg/m2 to about 10 kg/m2, and possesses a combination of a sound transmission class (STC) of about 33 or greater (as in accordance with ASTM E90-9 and ASTM E413-10 as described above), laminate loss factor of at least about 0.3, or at least about 0.4 (as determined in accordance with ISO16940:2008(E) as described above), an equivalent bending rigidity modulus of at least about 100 N·m, or at least about 130 N·m (as determined in accordance with ISO16940:2008(E) as described above), an effective thickness of at least about 2.6 mm, or at least about 2.8 mm (as determined in accordance with ISO1288-4:2016 (modified as described above, see equation-1), and a laminate haze of less than about 0.6 (as determined in accordance with ASTM D1003-61 (method A) as described above).

EXAMPLES

The invention will be further understood from the following specific examples of the properties of the laminated glass. However, it will be understood that these examples are not to be construed as limiting the scope of the present invention in any manner.

The following physical properties evaluations were conducted with respect to the laminated glasses obtained in the following Examples A-1 to A-5, B-1 to B-3, C-1 to C-3, D-1 and Comparative Examples CEX-1 to CEX-6.

Materials

The materials used in the following examples are as follows.

Melt indices (MI) were measured according to ASTM D1238 at a polymer melt temperature of 190° C. and under a weight of 2.16 kg.

The soda-lime-silica float glass (1.6 mm nominal thickness) used in the Examples was obtained from Technical Glass Products, Inc. (Nyland, Pa., USA).

PVB1—a monolayer PVB interlayer sold by Kuraray America, Inc. (Wilmington, Del., USA) under the trademark "BUTACITE".

AC-PVB—a trilayer PVB acoustic interlayer sold by Sekisui America, LLC, under the trademark "S-LEC Sound Acoustic Film".

CI1—an at least partially neutralized ethylene acid dipolymer ionomer obtained from E.I. du Pont de Nemours & Co. (Wilmington, Del., USA) (21.7% methacrylic acid, Na 26% neutralized, MI=1.8).

Sheet1—a monolayer ionomer interlayer sold by Kuraray America, Inc. (Wilmington, Del., USA) under the trademark "SENTRYGLAS", made from CI1.

I1—an at least partially neutralized ethylene acid terpolymer ionomer methacrylic acid, 10% n-butyl acrylate, Na 26% neutralized, MI=6.3).

I2—an at least partially neutralized ethylene acid terpolymer ionomer (21.7% methacrylic acid, 10% n-butyl acrylate, Zn 25% neutralized, MI=3.9).

I3—an at least partially neutralized ethylene acid terpolymer ionomer (21.7% methacrylic acid, 6.5% i-butyl acrylate, Zn 25% neutralized, MI=3.8).

TPE1—a hydrogenated polystyrene-polyisoprene-polystyrene tri-block copolymer thermoplastic elastomer having a content of 1,2-bond and 3,4-bond of 75%. Hard block/soft block ratio [Mw(A1)/Mw (A2)] of 1.00, a glass transition temperature of −15° C., a styrene content of 21% by mass, a hydrogenation rate of 84% and a weight-average molecular weight of 120,000.

TPE2—a hydrogenated polystyrene-polyisoprene/polybutadiene-polystyrene tri-block copolymer thermoplastic elastomer. Hard block/soft block ratio [Mw(A1)/Mw(A2)] of 0.30, a glass transition temperature of −30° C., a styrene content of 13% by mass, a hydrogenation rate of 85% and a weight-average molecular weight of 130,000.

MAN-PP—a maleic acid anhydride modified low-molecular-weight polypropylene containing a carboxylic acid anhydride group as the functional group sold under the trade designation UMEX 1010 by Sanyo Chemical.

Multilayer Film Preparation

Ionomer resin pellets and additives (in masterbatch) were fed to a skin layer extruder. The polymer was melted and heated through the zones of the extruder and discharged at a melt temperature of approximately 385° F. (196° C.). The ionomer melt was transferred by a heated melt line to a feedblock where the ionomer flow was split to form the two outer layers (A and C) of the interlayer structure.

The thermoplastic elastomer resin pellets and additives (in masterbatch) were fed to the core layer extruder. The elastomer polymer was melted and heated through the extruder and discharged at a melt temperature of approximately 415° F. (213° C.). The elastomer melt was transported by a heated melt line to the feedblock maintained at approximately 400° F. (204° C.). The elastomer melt flowed through the feedblock with the split ionomer layers contacting the elastomer on the top and bottom to form a trilayer sheet structure.

The melt phases were passed to the extrusion die maintained at approximately 400° F. (204° C.) and extruded through the die lips. The flow rates from the skin (ionomer) extruder and the core (elastomer) extruder were adjusted to give the desired ratio of skin-to-core layer thickness in the final sheet. The melt temperatures of each extruder were adjusted to give a good match of the melt viscosities of each polymer phase to prevent flow instabilities and optical distortion of the sheeting. The adjusters on the die lips were opened or closed to allow adjustment and improvement of the thickness (caliper) uniformity across the width of the sheet. The line speed was adjusted to give the desired total sheet caliper (sheet thickness).

The melt exiting the extrusion die was passed over a series of chilled rolls to cool the melt, forming the sheet product. The sheet was transported across a set of unheated transport rollers to further cool the sheeting. The solid sheet passed through a nip roll set to control and maintain constant line speed. The sheet was then wound on to a core at the windup (set to maintain constant tension in the sheeting) between the nip roll and the windup.

Glass Laminate Preparation

A pre-press assembly, in which the polymer interlayer laminate and glass were stacked in the desired order at room temperature, was placed into a disposable vacuum bag and held for 60 minutes under a vacuum of 25-30 inches of water to remove any air contained between the layers of the pre-press assembly. The pre-press assembly was loaded while still applying a vacuum to the bag into an air autoclave. The samples and bags were heated to 135° C. under an applied hydrostatic air pressure of 100 psig. The vacuum to the bag was removed after reaching 135° C. and the laminates were held for 90 minutes in an air autoclave at an applied hydrostatic pressure of 100 psig. The samples were then cooled at an approximate rate of 4° C./minute under constant pressure. After approximately 25 minutes of cooling, when the air temperature was less than about 50° C., the excess pressure was vented and the laminate was cooled to room temperature and removed from the autoclave.

The process used in the examples is similar to many standard industrial processes for the fabrication of laminated glass and resulted in materials with high clarity and minimal imperfections (bubbles etc.).

Physical Properties Evaluation

The following properties were measured for each of the examples and comparative examples:

STC—derived from STL in accordance with ASTM E430-10 as described above.

Laminate Loss Factor ($3^{rd}$ Mode)—determined in accordance with ISO16940:2008(E) as described above.

Laminate Bending Rigidity Modulus ($3^{rd}$ Mode)—determined in accordance with ISO16940:2008(E) as described above.

Laminate Effective Thickness—determined in accordance with ISO1288-4:2016 modified as described above.

Laminate Haze—determined in accordance with ASTM D1003-61 (method A) as described above.

Areal density is a measure of the weight per unit area of a material. In these examples the areal density was determined by measuring the weight and area of laminates used in the STC evaluation. Areal density is the weight (kg) divided by the sample projected area ($m^2$).

The laminate structures and measurement results are as follows. As can be seen from the results, only the use of interlayers in accordance with the present invention provided laminates with an overall desirable combination of acoustic damping, acoustic barrier, flexural strength, bending stiffness and optical properties.

TABLE 1

| Example | Interlayer | Outer Layer | Core Layer | Layer Ratio | Laminate Construction Glass-1 Thickness (mm) | Interlayer Thickness (mm) | Glass-2 Thickness (mm) |
|---|---|---|---|---|---|---|---|
| CEX-1 | None | NA | NA | All Glass | 4 | NA | NA |
| CEX-2 | Sheet1 (CI1) | NA | NA | Monolayer | 1.6 | 0.9 | 1.6 |
| CEX-3 | PVB | NA | NA | Monolayer | 1.6 | 0.8 | 1.6 |
| CEX-4 | AC-PVB | PVB | PVB | 7\|2\|7 | 1.6 | 0.8 | 1.6 |
| CEX-5 | Dipolymer/TPE/Dipolymer | CI1 | TPE1/TPE2 (3:1) | 1\|1\|1 | 1.6 | 0.8 | 1.6 |
| CEX-6 | Dipolymer/TPE/Dipolymer | CI1 | TPE1 | 1\|1\|1 | 1.6 | 0.8 | 1.6 |
| A-1 | Terpolymer/TPE/Terpolymer | I1 | TPE1/TPE2 (1:1) | 3\|5\|3 | 1.6 | 0.8 | 1.6 |
| A-2 | Terpolymer/TPE/Terpolymer | I1 | TPE1 | 2\|3\|2 | 1.6 | 0.8 | 1.6 |
| A-3 | Terpolymer/TPE/Terpolymer | I1 | TPE1/TPE2 (3:1) | 1\|1\|1 | 1.6 | 0.8 | 1.6 |
| A-4 | Terpolymer/TPE/Terpolymer | I1 | TPE1/TPE2 (1:3) | 1\|0.6\|1 | 1.6 | 0.8 | 1.6 |
| A-5 | Terpolymer/TPE/Terpolymer | I1 | TPE1/TPE2 (1:1) | 1\|0.6\|1 | 1.6 | 0.8 | 1.6 |
| B-1 | Terpolymer/TPE/Terpolymer | I2 | TPE1/TPE2 (3:1) | 1\|1\|1 | 1.6 | 0.8 | 1.6 |
| B-2 | Terpolymer/TPE/Terpolymer | I2 | TPE1/TPE2 (3:1) | 10\|9\|10 | 1.6 | 0.8 | 1.6 |
| B-3 | Terpolymer/TPE/Terpolymer | I2 | TPE1/TPE2 (3:1) | 5\|6\|5 | 1.6 | 0.8 | 1.6 |
| C-1 | Terpolymer/TPE/Terpolymer | I3 | TPE1/TPE2 (3:1) | 1\|1\|1 | 1.6 | 0.8 | 1.6 |
| C-2 | Terpolymer/TPE/Terpolymer | I3 | TPE1/TPE2 (3:1) | 10\|9\|10 | 1.6 | 0.8 | 1.6 |
| C-3 | Terpolymer/TPE/Terpolymer | I3 | TPE1/TPE2 (3:1) | 5\|6\|5 | 1.6 | 0.8 | 1.6 |
| D-1 | Terpolymer/TPE/Terpolymer | I3 | TPE1/TPE2 (3:1) + 5% MAN-PP | 1\|1\|1 | 1.6 | 0.8 | 1.6 |

TABLE 2

| Example | Laminate Sound Transmission Class | Laminate Loss Factor - 3rd Mode | Laminate Bending Rigidity Modulus - 3rd Mode (N · m) | Laminate Effective Thickness (mm) | Laminate Haze (%) | Laminate Areal Density (kg · $m^2$) |
|---|---|---|---|---|---|---|
| CEX-1 | 31 | 0.01 | 384 | 3.81 | 0.20 | 9.6 |
| CEX-2 | 31 | 0.03 | 361 | 3.92 | 0.51 | 9.1 |
| CEX-3 | 32 | 0.12 | 231 | 2.88 | 0.29 | 9.0 |
| CEX-4 | 33 | 0.45 | 124 | 2.64 | 0.33 | 9.0 |

TABLE 2-continued

| Example | Laminate Sound Transmission Class | Laminate Loss Factor - 3rd Mode | Laminate Bending Rigidity Modulus - 3rd Mode (N · m) | Laminate Effective Thickness (mm) | Laminate Haze (%) | Laminate Areal Density (kg · m$^2$) |
|---|---|---|---|---|---|---|
| CEX-5 | 33 | 0.45 | 175 | 2.99 | 0.68 | 8.9 |
| CEX-6 | 33 | 0.40 | 184 | 3.01 | 0.60 | 8.9 |
| A-1 | 33 | 0.41 | 70.7 | 2.81 | 0.42 | 8.9 |
| A-2 | 33 | 0.52 | 237 | 2.91 | 0.44 | 8.9 |
| A-3 | 33 | 0.45 | 170 | 2.96 | 0.34 | 8.9 |
| A-4 | 34 | 0.45 | 130 | 3.19 | 0.36 | 8.9 |
| A-5 | 33 | 0.48 | 183 | 3.16 | 0.52 | 8.9 |
| B-1 | 33 | 0.45 | 161 | 3.01 | 0.39 | 8.9 |
| B-2 | 33 | 0.41 | 165 | 3.05 | 0.39 | 8.9 |
| B-3 | 33 | 0.49 | 133 | 2.95 | 0.38 | 8.9 |
| C-1 | 33 | 0.44 | 184 | 3.10 | 0.31 | 8.9 |
| C-2 | 33 | 0.44 | 190 | 3.17 | 0.33 | 8.9 |
| C-3 | 33 | 0.50 | 175 | 3.09 | 0.32 | 8.9 |
| D-1 | 33 | 0.44 | 190 | 3.21 | 0.31 | 8.9 |

We claim:

1. A multilayer interlayer comprising:
   (1) a first skin layer A which is a layer of a first thermoplastic resin optionally containing one or more additives,
   (2) a second skin layer C which is a layer of a second thermoplastic resin optionally containing one or more additives, and
   (3) an acoustic damping layer B between the first skin layer A and the second skin layer C,
   wherein (I) the first thermoplastic resin and the second thermoplastic resin are the same or different, (II) at least one of the first thermoplastic resin and the second thermoplastic is a first ionomer resin, and (III) the acoustic damping layer B is a layer of a thermoplastic elastomer resin optionally containing one or more additives, and
   wherein the first ionomer resin is an at least partially neutralized ethylene acid copolymer comprising copolymerized units of:
   (a) ethylene,
   (b) from about 10 to about 30 wt % of at least one α,β-unsaturated carboxylic acid having 3 to 10 carbon atoms, and
   (c) from about 2 wt % to about 15 wt % of at least one derivative of an α,β-unsaturated carboxylic acid having 3 to 10 carbon atoms,
   wherein (i) the weight percentages of the copolymerized units are based on the total weight of the ethylene acid copolymer and the sum of the weight percentages of the copolymerized units is 100 wt %, (ii) the at least one derivative of an α,β-unsaturated carboxylic acid having 3 to 10 carbon atoms comprises an α,β-unsaturated carboxylic acid ester, and (iii) at least a portion of carboxylic acid groups of the α,β-unsaturated carboxylic acid are neutralized to form an ionomer comprising carboxylate groups having counterions.

2. The multilayer interlayer of claim 1, wherein the first ionomer resin is an at least partially neutralized ethylene acid copolymer comprising copolymerized units of:
   (i) ethylene,
   (ii) from about 10 wt % to about 30 wt % of at least one α,β-unsaturated carboxylic acid having 3 to 10 carbon atoms, and
   (iii) from about 5 wt % to about 15 wt % of at least one α,β-unsaturated carboxylic acid ester having 3 to 10 carbon atoms.

3. The multilayer interlayer of claim 1, wherein the at least one α,β-unsaturated carboxylic acid ester having 3 to 10 carbon atoms is one or more of n-butyl acrylate, n-butyl methacrylate, isobutyl acrylate and isobutyl methacrylate.

4. The multilayer interlayer of claim 1, wherein about 20% to about 30% of the total content of the carboxylic acid groups present in the ethylene acid copolymer are neutralized with a counterion selected from the group consisting of sodium cations, magnesium cations, zinc cations and combinations thereof.

5. The multilayer interlayer of claim 1, wherein the thermoplastic elastomer resin is a hydrogenated product of a block copolymer having:
   (i) an aromatic vinyl polymer block (a) containing about 60 mol % or more of an aromatic vinyl monomer unit, based on the aromatic vinyl polymer block, and
   (ii) an aliphatic unsaturated polymer block (b) containing about 60 mol % or more of a conjugated diene monomer unit, based on the aliphatic unsaturated polymer block,
   wherein the aliphatic unsaturated polymer block (b) contains about 50 mol % or more in total of an isoprene unit and a butadiene unit as the conjugated diene monomer unit, and
   wherein the amount of residual carbon-carbon double bonds the aliphatic unsaturated polymer block derived from conjugated diene monomer units is from about 2 to about 40 mol %.

6. The multilayer interlayer of claim 1, wherein layer B is a layer of two or more thermoplastic elastomer resins each having a different peak temperature of tan δ.

7. The multilayer interlayer of claim 6, wherein layer B is a layer of two thermoplastic elastomer resins with a difference in the peak temperature of tan δ of about 5° C. or more.

8. The multilayer interlayer of claim 1, wherein in that acoustic damping layer B is in direct contact with both first skin layer A and second skin layer C.

9. The multilayer interlayer of claim 1, wherein the first skin layer A is a layer of the ionomer resin, and second skin layer C is a layer of a different thermoplastic resin.

10. The multilayer interlayer of claim 1, wherein both of first skin layer A and second skin layer C are layers of the first ionomer resin.

11. The multilayer interlayer of claim 10, wherein the interlayer is substantially plasticizer free.

12. The multilayer interlayer of claim 1, wherein the thermoplastic elastomer resin comprises as an additive a maleic acid anhydride modified ethylene-based polymer or a propylene-based polymer.

13. The multilayer interlayer of claim 1, wherein a heat shielding material is contained in both of layer A and layer C.

14. The multilayer interlayer of claim 13, wherein the heat shielding material is (i) a cesium-doped tungsten oxide and is contained in an amount of from about 0.17 g/m2 to about 0.35 g/m2, (ii) a tin-doped indium oxide and is contained in an amount of from about 0.3 g/m2 to about 0.6 g/m2, or (iii) a mixture of a cesium-doped tungsten oxide and a tin-doped indium oxide, and is contained in an amount of from about 0.05 g/m2 to about 0.15 g/m2 cesium-doped tungsten oxide, and from about 0.4 g/m2 to about 0.5 g/m2 tin-doped indium oxide.

15. The multilayer interlayer of claim 1, wherein both layer A and layer C contain an ultraviolet ray absorber in an amount of from about 0.2 wt % to about 1 wt %, based on total weight of the layer, and/or wherein layer B contains an ultraviolet ray absorber in an amount of from about 0.25 wt % to about 0.5 wt %, based on total weight of the layer.

16. The multilayer interlayer of claim 1, wherein both layer A and layer C contain a light stabilizer in an amount up to about 0.8 wt %, based on total weight of the layer, and/or layer B contains a light stabilizer in an amount up to about 0.4 wt %, based on total weight of the layer.

17. The multilayer interlayer of claim 1, wherein both layer A and layer C contain an antioxidant in an amount up to about 0.2 wt %, based on total weight of the layer, and/or layer B contains an antioxidant in an amount up to about 0.1 wt %, based on total weight of the layer.

18. The multilayer interlayer of claim 1, wherein Layer B has a thickness of about 20 μm or more and about 300 μm or less; each of layers A and C has a thickness of about 100 μm or more and about 500 μm or less, the total thickness of the combination of the layers A and C is about 300 μm or more and about 750 μm or less; the total thickness of layer B/total thickness of the layer A+C is about 1/1 or less and about 1/30 or more; and the total thickness of the multilayer laminate is about 320 μm or more and about 1250 μm or less.

19. The multilayer interlayer of claim 1, wherein when the multilayer interlayer is laminated between two panes of glass to produce a laminate, the laminate possesses a combination of a sound transmission class of about 33 or greater, a laminate loss factor of at least about 0.4, an equivalent bending rigidity modulus of at least about 70 N·m, an effective thickness of at least about 2.8 mm, and a laminate haze of less than about 0.6.

20. The multilayer interlayer of claim 19, having an equivalent bending rigidity modulus of at least about 100 N·m.

21. A laminate comprising a first exterior sheet and a second exterior sheet having interposed therebetween a multilayer interlayer, wherein that the multilayer interlayer comprises:
(1) a first skin layer A which is a layer of a first thermoplastic resin optionally containing one or more additives,
(2) a second skin layer C which is a layer of a second thermoplastic resin optionally containing one or more additives, and
(3) an acoustic damping layer B between the first skin layer A and the second skin layer C,
wherein (1) the first thermoplastic resin and the second thermoplastic resin are the same or different, (II) at least one of the first thermoplastic resin and the second thermoplastic is a first ionomer resin, and (III) the acoustic damping layer B is a layer of a thermoplastic elastomer resin optionally containing one or more additives, and
wherein the first ionomer resin is an at least partially neutralized ethylene acid copolymer comprising copolymerized units of:
(a) ethylene,
(b) from about 10 to about 30 wt % of at least one α,β-unsaturated carboxylic acid having 3 to 10 carbon atoms, and
(c) from about 2 wt % to about 15 wt % of at least one derivative of an α,β-unsaturated carboxylic acid having 3 to 10 carbon atoms,
wherein (i) the weight percentages of the copolymerized units are based on the total weight of the ethylene acid copolymer and the sum of the weight percentages of the copolymerized units is 100 wt %, (ii) the at least one derivative of an α,β-unsaturated carboxylic acid having 3 to 10 carbon atoms comprises an α,β-unsaturated carboxylic acid ester, and (iii) at least a portion of carboxylic acid groups of the α,β-unsaturated carboxylic acid are neutralized to form an ionomer comprising carboxylate groups having counterions.

22. The laminate of claim 21, wherein both of the first exterior sheet and second exterior sheet are a sheet of glass.

23. The laminate of claim 22, wherein the first sheet of glass and the second sheet of glass are a different type of glass.

24. The laminate of claim 22, wherein the first sheet of glass and the second sheet of glass are different thicknesses.

25. The laminate of claim 21, possessing a combination of a sound transmission class of about 33 or greater, a laminate loss factor of at least about 0.4, an equivalent bending rigidity modulus of at least about 70 N·m, an effective thickness of at least about 2.8 mm, and a laminate haze of less than about 0.6, all measured as described in the specification.

26. The laminate of claim 25, having an equivalent bending rigidity modulus of at least about 100 N·m.

27. The laminate of claim 22, wherein the laminate has a mass in the range from about 7 kg/m2 to about 10 kg/m2.

28. The multilayer interlayer of claim 1, wherein a ratio of the total thickness of the acoustic damping layer to the total thickness of the skin layers is 1/1 or less.

29. The multilayer interlayer of claim 28, characterized in that the ratio of the total thickness of the acoustic damping layer to the total thickness of the skin layers is 1/2 or less.

30. The multilayer interlayer of claim 29, wherein the ratio of the total thickness of the acoustic damping layer to the total thickness of the skin layers is 1/3 or less.

31. The multilayer interlayer of claim 28, wherein the ratio of the total thickness of the acoustic damping layer to the total thickness of the skin layers is 1/30 or more.

32. The laminate of claim 21, wherein a ratio of the total thickness of the acoustic damping layer to the total thickness of the skin layers is 1/1 or less.

33. The laminate of claim 32, wherein the ratio of the total thickness of the acoustic damping layer to the total thickness of the skin layers is 1/2 or less.

34. The laminate of claim 33, wherein the ratio of the total thickness of the acoustic damping layer to the total thickness of the skin layers is 1/3 or less.

35. The laminate of claim 32, wherein the ratio of the total thickness of the acoustic damping layer to the total thickness of the skin layers is 1/30 or more.

36. The laminate of claim 27, wherein the laminate has a mass in the range from about 8 kg/m2 to about 9.5 kg/m2.

37. The laminate of claim 21, wherein the first ionomer resin is an at least partially neutralized ethylene acid copolymer comprising copolymerized units of:
(i) ethylene,
(ii) from about 10 wt % to about 30 wt % of at least one α,β-unsaturated carboxylic acid having 3 to 10 carbon atoms, and
(iii) from about 5 wt % to about 15 wt % of at least one α,β-unsaturated carboxylic acid ester having 3 to 10 carbon atoms.

38. The laminate of claim 21, wherein the at least one α,β-unsaturated carboxylic acid ester having 3 to 10 carbon atoms is one or more of n-butyl acrylate, n-butyl methacrylate, isobutyl acrylate and isobutyl methacrylate.

39. The laminate of claim 21, wherein the thermoplastic elastomer resin is a hydrogenated product of a block copolymer having:
(i) an aromatic vinyl polymer block (a) containing about 60 mol % or more of an aromatic vinyl monomer unit, based on the aromatic vinyl polymer block, and
(ii) an aliphatic unsaturated polymer block (b) containing about 60 mol % or more of a conjugated diene monomer unit, based on the aliphatic unsaturated polymer block, wherein the aliphatic unsaturated polymer block (b) contains about 50 mol % or more in total of an isoprene unit and a butadiene unit as the conjugated diene monomer unit, and wherein the amount of residual carbon-carbon double bonds the aliphatic unsaturated polymer block derived from conjugated diene monomer units is from about 2 to about 40 mol %.

40. The laminate of claim 21, wherein layer B is a layer of two or more thermoplastic elastomer resins each having a different peak temperature of tan δ.

41. The laminate of claim 21, wherein both of first skin layer A and second skin layer C are layers of the first ionomer resin.

42. The laminate of claim 21, wherein the multilayer interlayer is substantially plasticizer free.

43. The laminate of claim 21, wherein Layer B has a thickness of about 20 μm or more and about 300 μm or less; each of layers A and C has a thickness of about 100 μm or more and about 500 μm or less, the total thickness of the combination of the layers A and C is about 300 μm or more and about 750 μm or less: the total thickness of layer B/total thickness of the layer A+C is about 1/1 or less and about 1/30 or more; and the total thickness of the multilayer laminate is about 320 μm or more and about 1250 μm or less.

* * * * *